(12) United States Patent
Holme et al.

(10) Patent No.: US 9,137,970 B2
(45) Date of Patent: Sep. 22, 2015

(54) TRACKING SYSTEM AND METHOD

(75) Inventors: Christopher Douglas Holme, Osborne Park (AU); Reino Tauno Karvinen, Forrestfield (AU)

(73) Assignee: EDITH COWAN UNIVERSITY, Joondalup (AU)

(*) Notice: Subject to any disclaimer, the term of this patent is extended or adjusted under 35 U.S.C. 154(b) by 695 days.

(21) Appl. No.: 13/262,148

(22) PCT Filed: Mar. 31, 2010

(86) PCT No.: PCT/AU2010/000371
§ 371 (c)(1),
(2), (4) Date: Dec. 20, 2011

(87) PCT Pub. No.: WO2010/111742
PCT Pub. Date: Oct. 7, 2010

(65) Prior Publication Data
US 2012/0092132 A1    Apr. 19, 2012

(30) Foreign Application Priority Data

Mar. 31, 2009  (AU) ................................ 2009901398

(51) Int. Cl.
| | |
|---|---|
| G06K 7/01 | (2006.01) |
| A01K 11/00 | (2006.01) |
| G01D 9/00 | (2006.01) |
| H04W 84/18 | (2009.01) |

(52) U.S. Cl.
CPC .............. *A01K 11/008* (2013.01); *G01D 9/005* (2013.01); *H04W 84/18* (2013.01)

(58) Field of Classification Search
CPC ..... G08B 21/22; G08B 25/10; A01M 31/002; A01K 15/023; A01K 11/008; H04W 84/18; G01D 9/005

USPC .............. 340/10.1, 10.3, 10.34, 571.1, 573.1, 340/500, 539.1, 539.3, 539.11, 539.13, 340/539.15, 539.23, 540, 572.1, 573.3
See application file for complete search history.

(56) References Cited

U.S. PATENT DOCUMENTS

| | | | | |
|---|---|---|---|---|
| 5,565,858 | A | * | 10/1996 | Guthrie ....................... 340/10.33 |
| 5,621,388 | A | | 4/1997 | Sherburne et al. |
| 5,959,568 | A | * | 9/1999 | Woolley .......................... 342/42 |
| 7,479,884 | B1 | * | 1/2009 | Fullerton ................... 340/572.7 |
| 2002/0010390 | A1 | * | 1/2002 | Guice et al. ................... 600/300 |

(Continued)

FOREIGN PATENT DOCUMENTS

| | | |
|---|---|---|
| GB | 2386421 A | 9/2003 |
| WO | 94/00830 A1 | 1/1994 |
| WO | 2008/003139 A1 | 1/2008 |

*Primary Examiner* — Brian Zimmerman
*Assistant Examiner* — An T Nguyen
(74) *Attorney, Agent, or Firm* — Rothwell, Figg, Ernst & Manbeck, P.C.

(57) ABSTRACT

A tracking apparatus (1) comprising: a first mobile transceiver unit (2), and a second mobile transceiver unit (3), the first mobile transceiver unit being in wireless communication with the second mobile transceiver unit for the transfer of data therebetween, the first mobile transceiver unit being arranged for location within an environment and being operable to determine data regarding the environment and to emit some or all of the determined data which is received by the second mobile transceiver unit for storage thereon when it is determined by the first mobile transceiver unit that the second mobile transceiver unit is located within a distance of the first mobile transceiver unit.

25 Claims, 17 Drawing Sheets

(56) References Cited

U.S. PATENT DOCUMENTS

| | | | |
|---|---|---|---|
| 2002/0036569 A1* | 3/2002 | Martin | 340/573.1 |
| 2003/0034887 A1* | 2/2003 | Crabtree et al. | 340/539 |
| 2004/0155782 A1* | 8/2004 | Letkomiller et al. | 340/573.3 |
| 2005/0024187 A1* | 2/2005 | Kranz et al. | 340/10.33 |
| 2005/0261037 A1* | 11/2005 | Raghunath et al. | 455/574 |
| 2006/0001525 A1* | 1/2006 | Nitzan et al. | 340/10.1 |
| 2006/0001528 A1* | 1/2006 | Nitzan et al. | 340/10.33 |
| 2006/0034348 A1* | 2/2006 | Schaefer et al. | 375/130 |
| 2006/0132317 A1* | 6/2006 | Letkomiller et al. | 340/573.1 |
| 2007/0139163 A1* | 6/2007 | Powell et al. | 340/10.2 |
| 2008/0136642 A1 | 6/2008 | Wise | |
| 2008/0186145 A1* | 8/2008 | Manley et al. | 340/10.4 |
| 2008/0231449 A1* | 9/2008 | Moshfeghi | 340/572.1 |
| 2008/0252422 A1* | 10/2008 | Dowla et al. | 340/10.1 |
| 2010/0315203 A1* | 12/2010 | Peden et al. | 340/10.1 |
| 2012/0092132 A1* | 4/2012 | Holme et al. | 340/10.1 |

* cited by examiner

TRACKING SYSTEM AND METHOD

CROSS REFERENCE TO RELATED APPLICATIONS

This application is a 35 U.S.C. §371 National Phase Entry Application from PCT/AU2010/000371, filed Mar. 31, 2010, and designating the United States, which claims priority under 35 U.S.C. §119 to Australian Patent Application No. 2009901398filed Mar. 31, 2009, which is incorporated herein in its entirety.

FIELD OF THE INVENTION

The present invention relates to a system and method for tracking and recording interactions between entities. In this context, entities may be any suitable combination of living things and/or inanimate objects. The present invention has specific application for use in tracking and recording behaviour of animals, but has application in other fields.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

Additionally, throughout the specification, unless the context requires otherwise, the words "substantially" or "about" will be understood to not be limited to the value for the range qualified by the terms.

BACKGROUND ART

Each document, reference, patent application or patent cited in this text is expressly incorporated herein in their entirety by reference, which means that it should be read and considered by the reader as part of this text. That the document, reference, patent application, or patent cited in this text is not repeated in this text is merely for reasons of conciseness.

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Fox predation of native species is a serious problem in Australia, and south Western Australia in particular. Whilst it is known that the removal of foxes leads to increased numbers of native animals, their specific predation habits are largely unknown. Current methods of studying their predatory behaviour have typically involved direct observation, or evidence gathering. This has been somewhat problematic as, foxes being nocturnal, predation generally occurs during darkness. Furthermore, these animals often inhabit rough and inaccessible terrain, and may discover prey at any location within a wide area. The positive identification of individual animals has also proven difficult.

Ultra High Frequency ("UHF") Radio Frequency Identification ("RFID") devices have been used to monitor and track the presence of objects. Between 13 MHz and 2.4 GHz, many countries (including USA and Australia) have allocated space for unlicensed Industrial Scientific and Medical ("ISM") use, at 915 MHz and 433 MHz. Many commercial RFID systems employ the 915 MHz band, but experience has shown that signals at this frequency are subject to absorption by water, and may be particularly vulnerable to antenna de-tuning effects when placed in close proximity to water (including living biological tissue) or metal.

No RFID tag has the ability to monitor whether an animal in close proximity to the tag is alive or dead in addition to being activated exclusively by close range (less than 50 cm) transmissions whilst retaining the ability to transmit identification numbers and other data over a greater distance.

Many passive RFID tags are small enough and light enough to be placed on a small animal such as a field mouse. However, all prior art systems that the applicant is aware of are, at best, bi-directional in nature; requiring an interrogating unit to be in certain positions related to the tag in order that effective data transferral may take place.

DISCLOSURE OF THE INVENTION

The present invention seeks to overcome, or at least ameliorate, one or more of the deficiencies of the prior art mentioned above, or to provide the consumer with a useful or commercial choice.

Advantages of the present invention will become apparent from the following description, taken in connection with the accompanying drawings, wherein, by way of illustration and example, a preferred embodiment of the present invention is disclosed.

According to a first broad aspect of the present invention, there is provided a tracking apparatus comprising: a first mobile transceiver unit, and a second mobile transceiver unit, the first mobile transceiver unit being in wireless communication with the second mobile transceiver unit for the transfer of data therebetween, the first mobile transceiver unit being arranged for location within an environment and being operable to determine data regarding the environment and to emit some or all of the determined data which is received by the second mobile transceiver unit for storage thereon when it is determined by the first mobile transceiver unit that the second mobile transceiver unit is located within a distance of the first mobile transceiver unit.

Preferably, the first mobile transceiver unit is operable to communicate the determined data for receipt by the second mobile transceiver unit in response to a request signal from the second mobile transceiver unit.

Preferably, the apparatus further comprises a data collection unit, wherein the second mobile transceiver unit is in wireless communication with the data collection unit such that the stored determined data can be transferred to the data collection unit.

Preferably, the second mobiled transceiver unit is operable to determine the presence of a data collection unit, and, in response to the determination of the presence of a data collection unit to transfer the stored determined data to the data collection unit.

Preferably, the distance is predetermined, and the first mobile transceiver unit includes a detector for determination of the presence of a second mobile transceiver unit within the predetermined distance.

Preferably, the detector comprises a passive detection circuit.

Preferably, the first mobile transceiver unit includes one or more sensors for determining data regarding the environment in which the first mobile transceiver unit is located.

Preferably, the one or more sensors include: a temperature sensor, a power sensor, and/or a motion sensor.

Preferably, the power sensor comprises a battery voltage sensor operable to sense a voltage of a battery providing power to the first mobile transceiver unit.

Preferably, the motion sensor comprises an accelerometer.

Preferably, the second mobile transceiver unit operates in a first mode and includes a sensor operable to change state when subject to a condition, the second transceiver unit being operable to change to a second mode in response to a detected change in state of the sensor, providing an indication that the condition has been sensed by the sensor.

Preferably, the first mode comprises a lower power default mode, and the second mode comprises a higher power mode.

Preferably, the sensor comprises a motion detector. In this case the condition comprises subjection of the motion detector to motion, and the indication provided is that the second mobile transceiver unit is in motion.

Preferably, the first mobile transceiver unit has a unique identifier, details of which are communicated to the second mobile transceiver unit as part of the determined data.

Preferably, the second mobile transceiver unit has a unique identifier, details of which are communicated to the data collection unit as part of the determined data.

Preferably, the first and second mobile transceiver units comprise a radio frequency transceiver, preferably operating at 433 MHz.

According to a second broad aspect of the present invention, there is provided a system for tracking an entity, the system comprising: a first module having a first communication device, and a second module having a second communication device, the first communication device being in communication with the second communication device for the transfer of data therebetween, the first module being arranged for location proximate the entity and being operable to determine data via a sensor and to communicate some or all of the determined data for receipt by the second module for storage on a storage medium when it is determined that the second module is located within a distance of the first module.

Preferably, the first module and/or the second module are mobile or portable.

Preferably, the communication comprises wireless communication.

Preferably, the first communication device is operable to communicate the determined data for receipt by the second communication device in response to a request from the second communication device.

Preferably, the system further comprises a data collection module, wherein the first communication device and/or the second communication device is in communication with the data collection module such that the determined data can be transferred to the data collection module.

Preferably, the first module and/or the second module is operable to determine the presence of a data collection module, and, in response to the determination of the presence of a data collection module to transfer the determined data to the data collection module.

Preferably, the distance is predetermined, and the first module includes a detector for determination of the presence of a second module within the predetermined distance.

Preferably, the detector comprises a passive detection circuit.

Preferably, the sensor is operable to determine data regarding the entity and/or an environment in which the sensor is located.

Preferably, the module comprises a set of sensors.

Preferably, the set of sensors include: a temperature sensor, a power sensor, and/or a motion sensor.

Preferably, the power sensor comprises a battery voltage sensor operable to sense a voltage of a battery providing power to the first module.

Preferably, the motion sensor comprises an accelerometer. Any suitable accelerometer integrated circuit can be used.

Preferably, the first module and/or the second module operates in a first mode and includes a sensor operable to change state when subject to a condition, the first module and/or the second module being operable to change to a second mode in response to a detected change in state of the sensor, providing an indication that the condition has been sensed by the sensor.

Preferably, the first mode comprises a lower power default mode, and the second mode comprises a higher power mode.

Preferably, the sensor comprises a motion detector. In this case the condition comprises subjection of the motion detector to motion, and the indication provided is that the first module and/or the second module is in motion.

Preferably, the first module and/or the second module have a unique identifier, details of which are communicated as part of the determined data.

In accordance with a third broad aspect of the present invention, there is provided a tracking method, the method comprising the steps of mounting a first mobile transceiver unit on a first entity, mounting a second mobile transceiver unit on a second entity, determining data using a sensor of the first mobile transceiver unit, determining that the second mobile transceiver unit and the first mobile transceiver unit are within a distance, transmitting the determined data to the second mobile transceiver unit in response to the determined distance, and storing some or all of the determined data on the second mobile transceiver unit.

Preferably, the determined data relates to the first entity and/or to an environment of the first entity.

Preferably, the determined data is communicated from the first mobile transceiver unit to the second mobile transceiver unit in response to a request signal from the second mobile transceiver unit.

Preferably, the method includes the further step of determining when a data collection unit is located within a distance of the second mobile transceiver unit, and communicating the stored determined data to the data collection unit when it is located within the distance.

Preferably, the distance is predetermined.

Preferably, when the determined data relates to the first entity it includes a temperature of the first entity.

Preferably, the method includes the step of determining whether the second entity is in motion.

According to a fourth broad aspect of the present invention, there is provided a method for tracking an entity, the method comprising the steps of associating a mobile first module having a communication device with the entity, determining data regarding the entity using a sensor of the first module, determining that the first module is within a distance of a second module, communicating the determined data to the second module in response to the determined distance, and storing some or all of the determined data on a storage medium of the second module.

Preferably, associating the first module with the entity comprises mounting the first module on the entity or implanting the first module at least partially within the entity.

Preferably, the second module comprises a data collection module.

According to a fifth broad aspect of the present invention, there is provided a mobile transceiver unit for use in a tracking apparatus in accordance with the first broad aspect of the invention as hereinbefore described.

According to a sixth broad aspect of the present invention, there is provided a data collection unit for use in a tracking apparatus in accordance with the first broad aspect of the invention as hereinbefore described.

According to a seventh broad aspect of the present invention, there is provided a module for use in a system for tracking an entity in accordance with the second broad aspect of the invention as hereinbefore described.

According to an eighth broad aspect of the present invention, there is provided a data collection module for use in a system for tracking an entity in accordance with the second broad aspect of the invention as hereinbefore described.

The first and second mobile transceiver units can be mounted on animals to track and monitor both prey and predators in their native or natural environments. Typically, first mobile transceiver units would be used on prey and second mobile units on their predators.

The choice of 433 MHz offers a compromise between antenna size, attenuation due to water, and relative immunity to the anticipated de-tuning effects caused by proximity to living tissue. Currently there are no commercially available units in this band which offer the required performance characteristics.

Embodiments of the prey and predator units of the present invention may have the following advantages, in that they are:
  small and lightweight enough to fit on collars without affecting animal behaviour;
  operate for a minimum period of 1 year;
  survive immersion in water;
  operate in moist environments, including during periods of rainfall/heavy mist;
  operate in close proximity to living tissue;
  durable, and immune to damage from light impact; and
  permit communication in crowded environments (i.e.: multiple prey and predator modules), through the provision of collision-avoidance protocols.

Embodiments of the invention described herein may provide a novel research tool and methodology which will provide valuable insight into the predation habits of foxes and/or other predators. Current methods typically involve direct observation, or evidence gathering, and the identification of individual animals is problematic. In contrast, embodiments of the present system will electronically record interactions between predator and prey, permitting the positive identification of individual animals in each encounter.

This project has required the design and development of a passively activated 433 MHz RFID tag. Currently there are no commercially available units with the required characteristics operating in this band.

Novel power-management strategies are required to enable embodiments of the system of the invention to operate over an extended period. The transmitter affixed to the predator module in such embodiments will periodically emit a request to all tags in the region. The motion detection sensor will control power to this circuitry, disabling it during long periods of predator inactivity. This passive triggering mechanism enables power conservation on the prey unit while waiting to be interrogated.

BRIEF DESCRIPTION OF THE DRAWINGS

The invention will now be described, by way of example only, with reference to the accompanying drawings, of which.

BEST MODE(S) FOR CARRYING OUT THE INVENTION

Figure 1:
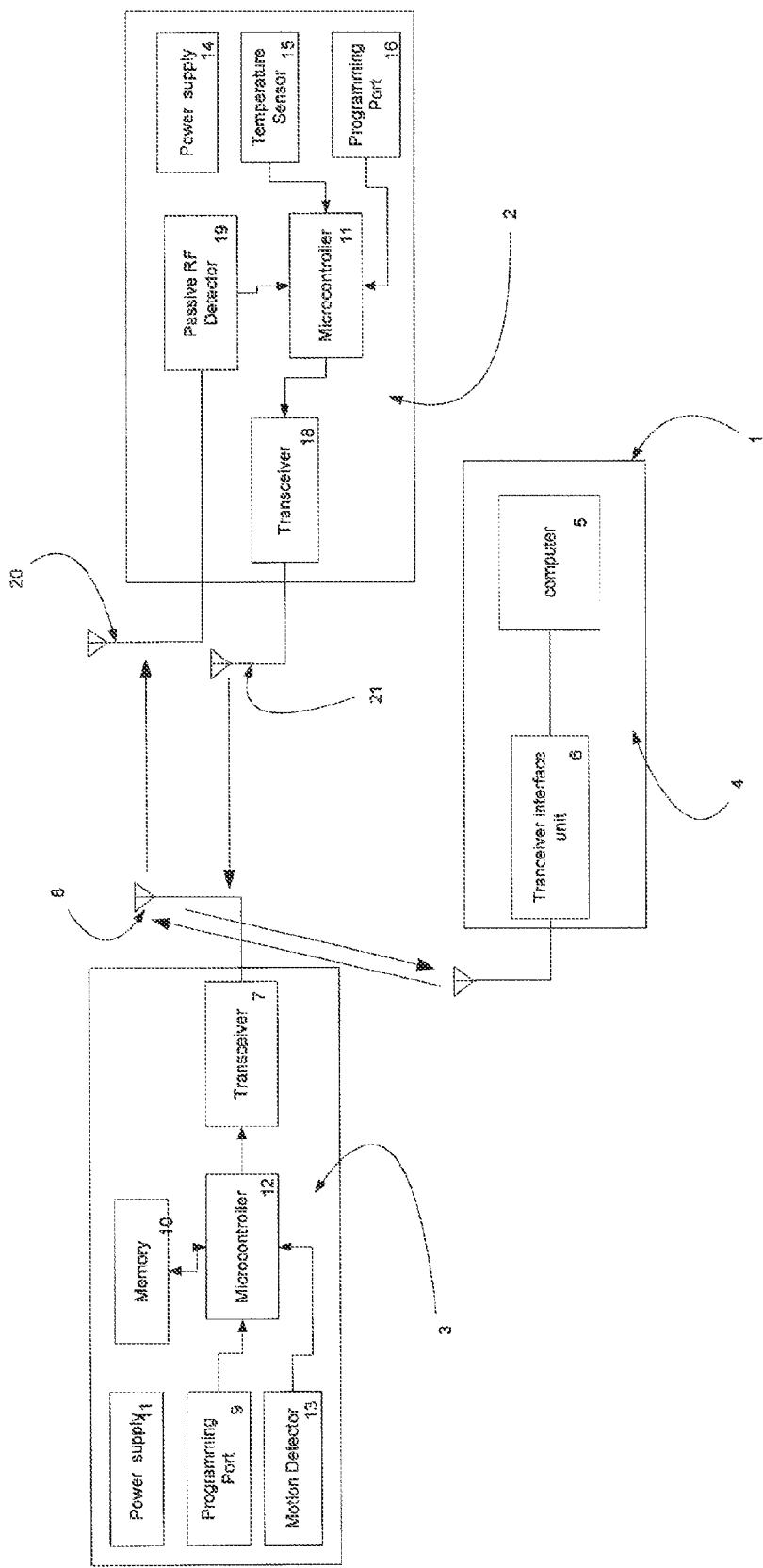
FIG. 1 depicts a system diagram of a first embodiment of a tracking system in accordance with an aspect of the present invention.

In FIG. 1, there is depicted a first embodiment of a system for tracking an entity ("tracking system") 1 in accordance with an aspect of the present invention.

In the embodiment described, the tracking system 1 is operable to electronically record interactions between entities comprising predator and prey animals, permitting the positive identification of individual animals in each encounter. Both predator and prey will be fitted with collars containing sensors, telemetry and data logging components of the system 1, as will be described in further detail below.

In alternative embodiments of the invention, entities other than predator and prey animals may be tracked, and entities may comprise any suitable combination of living things and/or inanimate objects or articles.

The tracking system 1 of the first embodiment uses Radio Frequency Identification ("RFID") which is particularly suited to the resolution of this problem, as it minimises disruption to the subjects and environment, and enables the automated remote capture of data.

As illustrated schematically in FIG. 1, the tracking system 1 comprises a first module in the form of a prey unit 2, a second module in the form of a predator unit 3, and a third module in the form of a Field Data Collection Unit (FDCU) 4. The prey unit 2 and the predator unit 3 are capable of wireless communication with each other, and the FCDU 4 is capable of wireless communication with predator unit 3 to transmit and receive data therebetween, as will be described further below. In practice, the system will employ many prey units and many predator units: one unit for each prey or predator as appropriate.

Any suitable communication protocol can be used to facilitate the communication of information or data between components of the tracking system 1, and between the tracking system 1 and other devices, including wired and wireless, as are well known to persons skilled in the art and need not be described in any further detail herein except as is relevant to the present invention. In this embodiment of the invention, the prey unit 2 is in the form of a light-weight, portable or mobile module that can be mounted on a collar (not shown) for affixing to selected prey. The prey unit 2 is operable to emit a unique identifier on a radio frequency in the form of RFID signals.

Similarly, the predator unit 3 also comprises a light-weight, portable or mobile module that can be mounted on a collar (not shown) for affixing to selected predators. The predator unit 3 is operable to receive and log RFID signals emitted by the prey unit 2 when the prey unit 2 is within a predetermined range or distance of the predator unit 3. It is also operable to wirelessly communicate with the FCDU 4 as described in more detail below.

The FCDU 4 is operable to remotely retrieve the data stored at the predator unit 3 by a download of the data from the predator unit 3 via a radio frequency link between the predator unit 3 and the FCDU 4. The FDCU 4, under control of software running thereon, is operable to enable a user (such as a researcher) to locate and identify individual animals to which the predator units 3 are attached. Using the FCDU 4, the user is also be able to configure parameters on both the predator unit 3 and the prey unit 2, such as transmission power level and interrogation period. In the embodiment described herein, the FCDU 4 comprises a computer 5 operably attached or connected to a transceiver interface unit 6.

The computer 5 can be of any suitable type and may include any device capable of communicating with other components of the tracking system 1, including a laptop/notebook or tablet computer such as that marketed under the trade mark IPAD® by Apple Inc, or a smartphone such as that marketed under the trade mark PHONE® by Apple Inc.

The software, or any set of instructions or programs for the computer 5 and other components of the tracking system 1, can be written in any suitable language, as are well known to persons skilled in the art. The software can be provided as standalone application(s) or via a network, depending on the system requirements.

In order to conserve power, the predator units 3 are operable to trigger a prey unit 2 to send its unique identifier, after which the prey unit 2 will resume a low-power mode of operation. This is described further below.

The selection of frequency of operation for the modules is an important design constraint, as this requires a compromise between a number of legislative and technical constraints. For efficient operation, antenna length is inversely proportional to the frequency transmitted. Lower frequencies are associated with long wavelengths (e.g.: 22 m at 13 MHz), and therefore require correspondingly large antennae to transmit an electric field efficiently. Conversely, higher frequency signals have shorter wavelengths (e.g.: 12 cm at 2.4 GHz), and may employ smaller antennae.

Energised antenna produce both a magnetic and an electric field, and either field may be used to transfer RF energy, by optimising the design of the antenna accordingly. Antennae optimised to radiate magnetic fields may be significantly smaller than their electric-field counterparts for a given frequency. Examples of magnetic field systems are commonplace in many 13.56 MHz (HF band) RFID tag systems, which may employ small (1 cm diameter) loop antennae. However, the magnetic field diminishes at a far greater rate with distance than the electric field. Hence range for a low-powered magnetic field device may only be in the order of several centimeters, and may extend several kilometers for the much larger electric-field antenna.

Higher frequency signals are more subject to attenuation in wet environments due to absorption by water. This is particularly so for those frequencies in the microwave 2.4 GHz range. As these devices must operate in an uncontrolled bush environment which may include mist or rainfall, this band is not viable for the embodiment described, but may be suitable in alternative embodiments of the invention.

Between 13 MHz and 2.4 GHz, many countries (including USA and Australia) have allocated space for unlicensed Industrial Scientific and Medical ("ISM") use, at 915 MHz and 433 MHz. Many commercial UHF RFID systems employ the 915 MHz band, but experience has shown that signals at this frequency are still subject to absorption by water, and may be particularly vulnerable to antenna de-tuning effects when placed in close proximity to water or metal. Given that the predator unit 3 and the prey unit 2 would be mounted on collars, this frequency band was discounted, in the first embodiment of the invention. The choice of 433 MHz offers a compromise between antenna size, attenuation due to water, and relative immunity to the anticipated de-tuning effects caused by proximity to living tissue. Currently there are no commercially available units in this band which offer the required performance characteristics. Thus, the tracker system 1 of the present invention provides for a prey unit 2 and predator unit 3 using a 433 MHz RFID tag and reader respectively.

In alternative embodiments of the invention, where the relevant system units/modules are associated with or attached to entities by means other than collars, such as implanted pellets or tags, other frequency bands may be appropriate.

The design of the predator unit 3 and the prey unit 2 will now be described.

In the first embodiment of the invention, both the predator unit 3 and the prey unit 2 are based on the 433 MHz Nordic nRF401 transceiver chip and the Microchip PIC 16F684 microcontroller chips. The nRF401 are designed for development of short range RF devices and are suitable for this project due to their low power consumption and small size.

As can be seen from FIG. 1, the predator unit 3 comprises a communications device in the form of a transceiver 7 having a predator unit antenna 8 coupled thereto, a controller in the form of a predator unit microcontroller 12, a storage medium in the form of predator unit memory 10, a sensor in the form of a motion detector 13, a predator unit power supply 11 and predator unit programming port 9.

Figure 2:
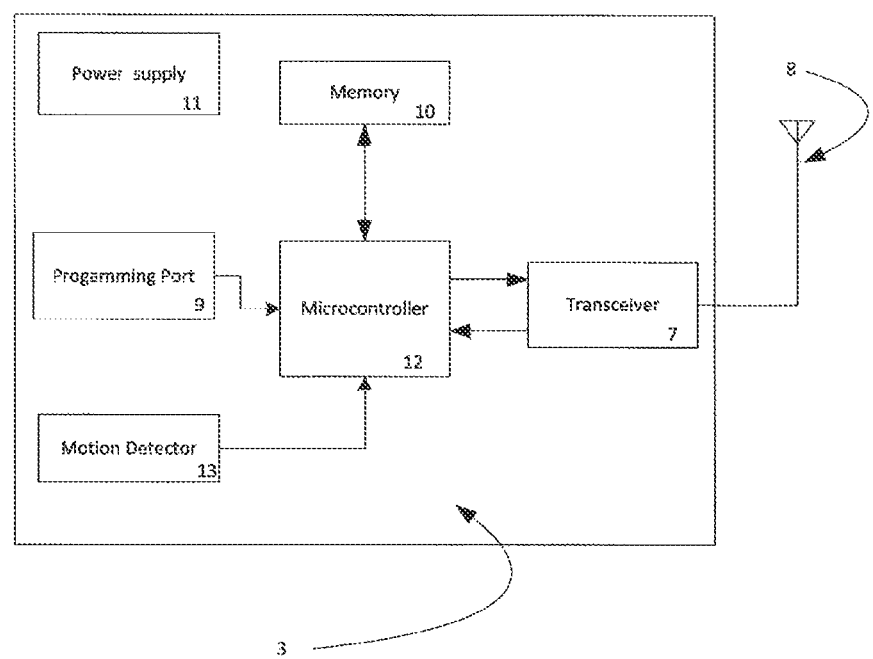
FIG. 2 depicts a block diagram for a predator unit of the system of FIG. 1.

The block diagram for the predator unit 3 of the first embodiment of the invention is provided at FIG. 2.

In the first embodiment of the invention, the predator unit 3 incorporates an nRF401 transceiver chip 7 coupled to the antenna 8. The programming port 9 enables a user to program the predator unit microcontroller 12 firmware and is removed from the printed circuit board upon which the predator unit microcontroller 12 is mounted, which is then encapsulated in water proofing material, during the construction process. The configuration data is hardwired as is described in this specification. The predator unit microcontroller 12 is a PIC 16F684 microcontroller chip, although other suitable microcontroller chips could be used. In an alternative embodiment, programming of user configurable data such as ID numbers may be achieved, for example, by radio frequency (RF) means.

A filtered power supply 11 provides the power supply for the predator unit 3. The predator unit memory 10 is used to store data received by the predator unit 3 from the prey unit 2 and in the first embodiment comprises a 512 k EEPROM memory, although any suitable memory device could be used.

The motion detector 13 is—in the first embodiment—a known miniature (about the size of a split pea) non-mercury movement and vibration sensor. The motion detector 13 is non-position-sensitive and reacts when disturbed by giving a fleeting change of state (i.e. normally open to normally closed, or visa versa). The predator unit microcontroller 12 is operable to sense this change on its input and, from the frequency of state changes, to estimate the activity state (asleep, walking, running etc) of the animal on to which the predator unit 3 is mounted.

In the first embodiment, the prey unit 2 comprises a communications device in the form of a prey unit transceiver 18, a controller in the form of a prey unit microcontroller 17, a sensor in the form of a temperature sensor 15, a first prey unit antenna 21 coupled to the prey unit transceiver 18, a prey unit power supply 14, and a second prey unit antenna 20 coupled to a passive RF detector circuit 19.

In the first embodiment, the prey unit microcontroller 17 is also a PIC16F684 chip as is used in the predator unit 3, and includes a storage medium in the form of a prey unit EEPROM memory (not shown). Again, other suitable microcontroller chips can be used.

Figure 3A:
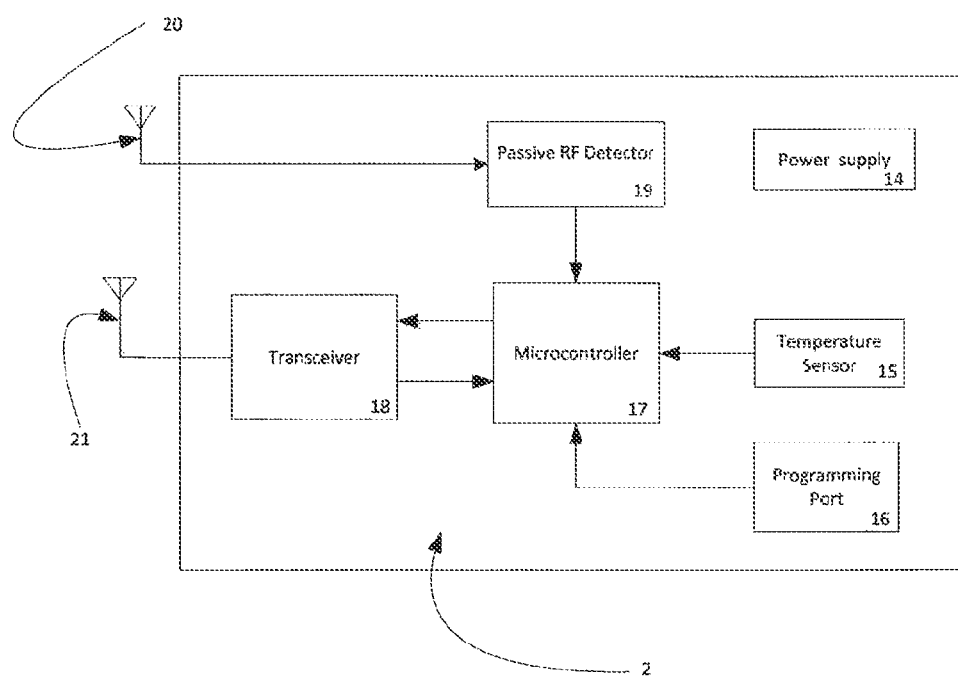
FIG. 3A depicts a block diagram for a prey unit of the system of FIG. 1.

A block diagram for the prey unit 2 is provided in FIG. 3A.

In the first embodiment of the invention, the prey unit transceiver 18 comprises an nRF401 transceiver but only requires use of the transmit mode in normal use. Identical RF transceiver chips are used on both the prey and predator units to maintain operational compatibility.

In an alternative embodiment, the prey unit transceiver 18 can operate in a first or receive mode during initial start-up of the prey unit 2. In this instance, the prey unit 2, under control of the prey unit microcontroller 17, will listen or monitor for an RF signal from the FDCU 4 which will provide configuration parameters such as ID number, and temperature/signal level thresholds. In this way, when the prey unit 2 is first switched on the user may download parameters to the prey unit 2 from the FDCU 4 via an RF signal. Once this configuration has taken place the prey unit 2 will enter the usual low power state or mode while monitoring the passive detection circuit and react as described when triggered—and is described in more detail below.

The temperature sensor 15 is used to sense the ambient temperature around the prey unit 2, and specifically the temperature of the prey onto which the prey unit 2 is mounted. When the temperature is sensed to fall below a preset or predetermined value (set according to environmental conditions), then a determination is made by the prey unit 2 that the prey has died. If this event occurs then the data is stored on the prey unit EEPROM memory for later uploading to the predator unit 3 as will be described in more detail below.

The prey unit programming port 16 enables the prey unit 2 to be programmed in the same way as with the predator unit 3 described above, i.e. the programming port 16 is used to enable a user to program the prey unit microcontroller 17 firmware and is removed from the printed circuit board—upon which the prey unit microcontroller 17 is mounted—and which is then encapsulated in water proofing material, during the construction process. The prey unit 2 data configured includes a prey unit unique identifier, as well as additional data such as temperature sensor parameters, and passive RF detector circuit 19 parameters.

Figure 3B:
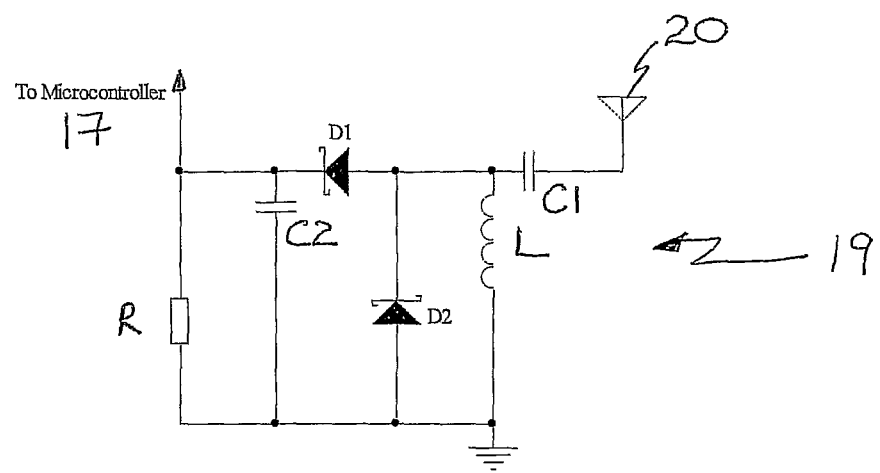
FIG. 3B depicts a circuit diagram for the passive detection circuit of the prey unit of FIG. 3A.

The prey unit 2 is activated from the default low-power mode by the close proximity of the predator unit 3, using the passive RF detector circuit 19. The passive RF detector circuit 19 is illustrated in FIG. 3B. The passive detector circuit 19 includes first and second diodes D1, D2, capacitors C1, C2, and inductance L, and an optional resistor R. The passive detector circuit 19 is coupled to the prey unit microcontroller 17, and has an antenna 20. In the first embodiment, the capacitor C1 has a value of 3.3 pF, the capacitor C2 has a value of 10 pF, the inductance a value of 33 nH, and the resistor a value of 10 MΩ. It would be understood to a person skilled in the art, that other suitable combinations of value may be used. The passive RF detector circuit 19 develops a voltage in the presence of an external RF signal in close proximity. This voltage is multiplied by the diode and capacitor arrangement in the passive RF detector circuit 19, which is measured by the analogue to digital input on the prey unit microcontroller 17. Once a predetermined voltage is reached, then the prey unit microcontroller 17 is operable to activate the prey unit transceiver 18, which is then operable to transmit the prey unit unique identifier as will be described in further detail below. In this way, the prey unit 2 is only active and transmitting when a predator unit 3 is in close proximity to the prey unit 2. This provides for power conservation—an important consideration when these units are operating 'in the field'. The inclusion of an inductor filters out unwanted frequencies.

The FDCU 4 comprises—as mentioned above—a computer 5 coupled to a transceiver interface unit 6. The computer 5 includes display means in the form of a monitor or visual display, a container for housing various, operably connected components of the computer 5 such as the motherboard, processor, memory, disk drives and power supply of the computer 5, and control means such as a keyboard and other suitable peripheral devices such as a mouse. Together, the display, keyboard and other peripheral devices provide a user interface or human or man machine interface ("HMI") to enable the user to interact with and control the tracking system 1. In particular, the HMI allows the user to: input data to the tracking system 1; view and manage data downloaded from the predator unit 3; and configure the system 1, the predator unit 3, and the prey unit 2.

The computer 5 is operable, under control of the software, to generate and display a set of electronic pages or screens via the HMI, examples of which are depicted in FIGS. 4D to 4G of the drawings. The user is able to navigate the pages and to select a particular page by touching or clicking on labelled tabs 52 associated with each page and provided on a first page 54 labelled or designated as a "MAIN" page. The electronic pages include a second page 56 labelled or designated as a "TRACKING" page, a third page 58 labelled or designated as an "INTERACTIONS" page, and a fourth page 60 labelled or designated as a "CONFIGURATION" page.

The MAIN page 54 allows the user to select functions of the system 1.

The TRACKING page 56 facilitates the tracking of either prey or predator via the unique identifier of the associated prey unit 2 or predator unit 3 by providing the following functions/information:

Unit ID Filter—is the specific module (collar) selected to be identified in the field (via the relevant ID number).

Group Filter—is the selected designated group that a module (such as a prey unit 2 or a predator unit 3) has been assigned i.e. for predators it could be fox or wild cat, for example. In prey it could be, for example, the woylie, or other prey being tracked. It should be appreciated that the predators and prey are not limited to being land based or terrestrial/tellurian animals, and in alternative embodiments of the invention can be inhabitants of water or aquatic/marine environments, or air/avian environments, or combinations thereof.

Group Number—displays the group of the module within receive range.

Unit ID Number—displays the specific module within the group number that is being detected.

Battery Volts—reports on the battery level of the module.

Status—refers to mortality, whether associated animal is determined as dead or alive.

The INTERACTION page 58 facilitates the uploading of data from a predator unit 3 to the FCDU 4 by providing the following functions/information:

Unit ID filter—is the specific selected predator module (collar) to be identified in the field (via the relevant ID number).

Group Filter—is the selected designated group that a module has been assigned i.e. for predators it could be fox or wild cat, for example.

Group Number—displays the group of the module within receive range.

Unit ID Number—displays the specific module within the group number that is being detected.

Battery Volts—reports on the battery level of the module.

Interactions—indicates whether the predator associated with the predator module 3 has had any prey interactions (with prey associated with the prey unit 2).

Filter ID number/Stop filtering—this button switches between the two options and provides the stated condition.

Enable Data Upload/disable Data Load—this button switches between the two options and provides the stated condition.

The CONFIGURATION page 60 allows the user to enter configuration settings and profiles for the system 1. In particular, the CONFIGURATION page is operable to enable the user to set configuration settings of each module (pedatore unit 3/prey unit 2) (predator/prey) before being released, including information such as the ID, Group ID, and threshold settings for movement, temperature, passive detect range, and module type, for example. An ERASE option allows the module to be cleared and re-assigned when re-used. A CONFIGURE option sets the determined configuration settings. A GET CONFIGURE option is used to show configuration settings on a module.

The computer 5 runs the software that provides for the operability of the FCDU 4 as will be described below.

The transceiver interface unit 6 comprises an FCDU RF module 22 and an FCDU RS232 interface unit 24, with a FCDU power supply 25 providing power to both the RF module 22 and the RS232 interface unit 24.

Figure 4A:
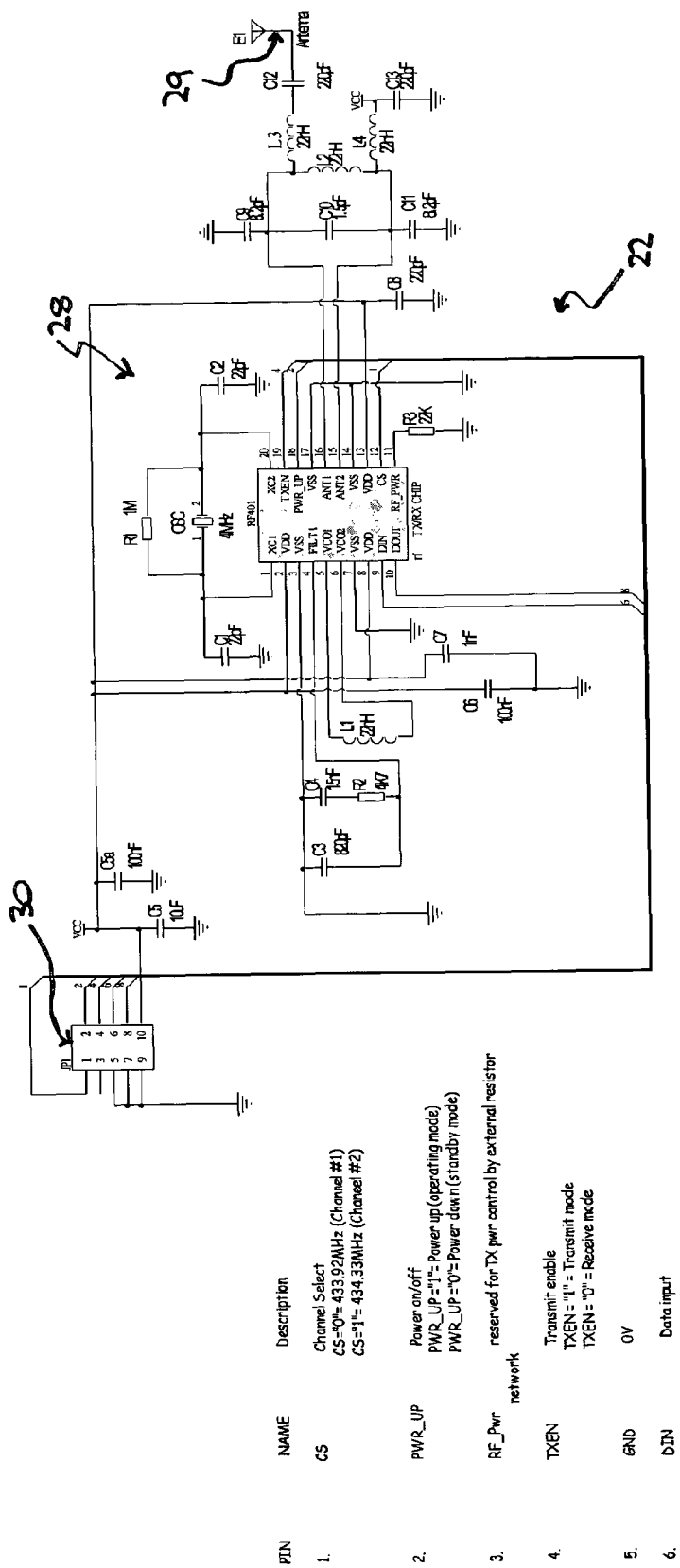
FIGS. 4A and 4B depict circuit diagrams for components of a Field Data Collection Unit of the system of FIG. 1.
Figure 4B:
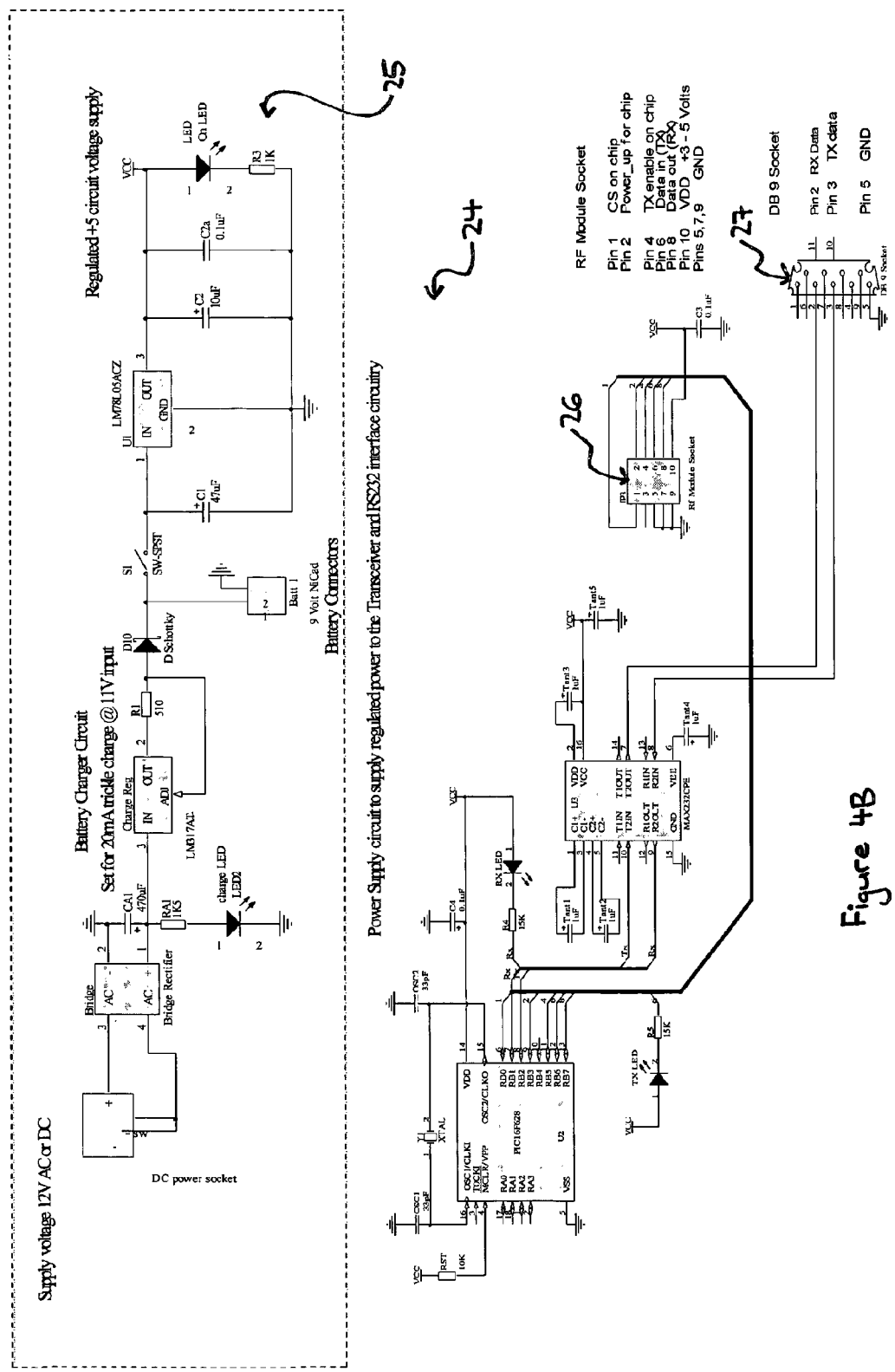

FIGS. 4A and 4B are circuit diagrams for the FCDU RF module 22 and the FCDU RS232 interface unit 24 respectively.

The FCDU RS232 interface unit 24 includes an RF module socket 26 for coupling the FCDU RF module 22 to the FCDU RS232 interface unit via a corresponding socket 30 on the RF module 22, and a DB9 socket for coupling the FCDU RS232 interface unit 24 to the laptop for the transmission of data between the laptop 5 and the RF module 22. The RS232 interface unit 24 comprises a standard serial to TTL circuit. The use of RF interfaces and DB 9 sockets for data communications is well known to person skilled in the art, and need not be described in any further detail herein. The FCDU RF module 22 includes RF module transceiver 27 coupled to an FCDU antenna 29. The FCDU antenna is a high gain directional antenna to extend range, and assist with locating or tracking the predator unit 3.

Figure 4C:
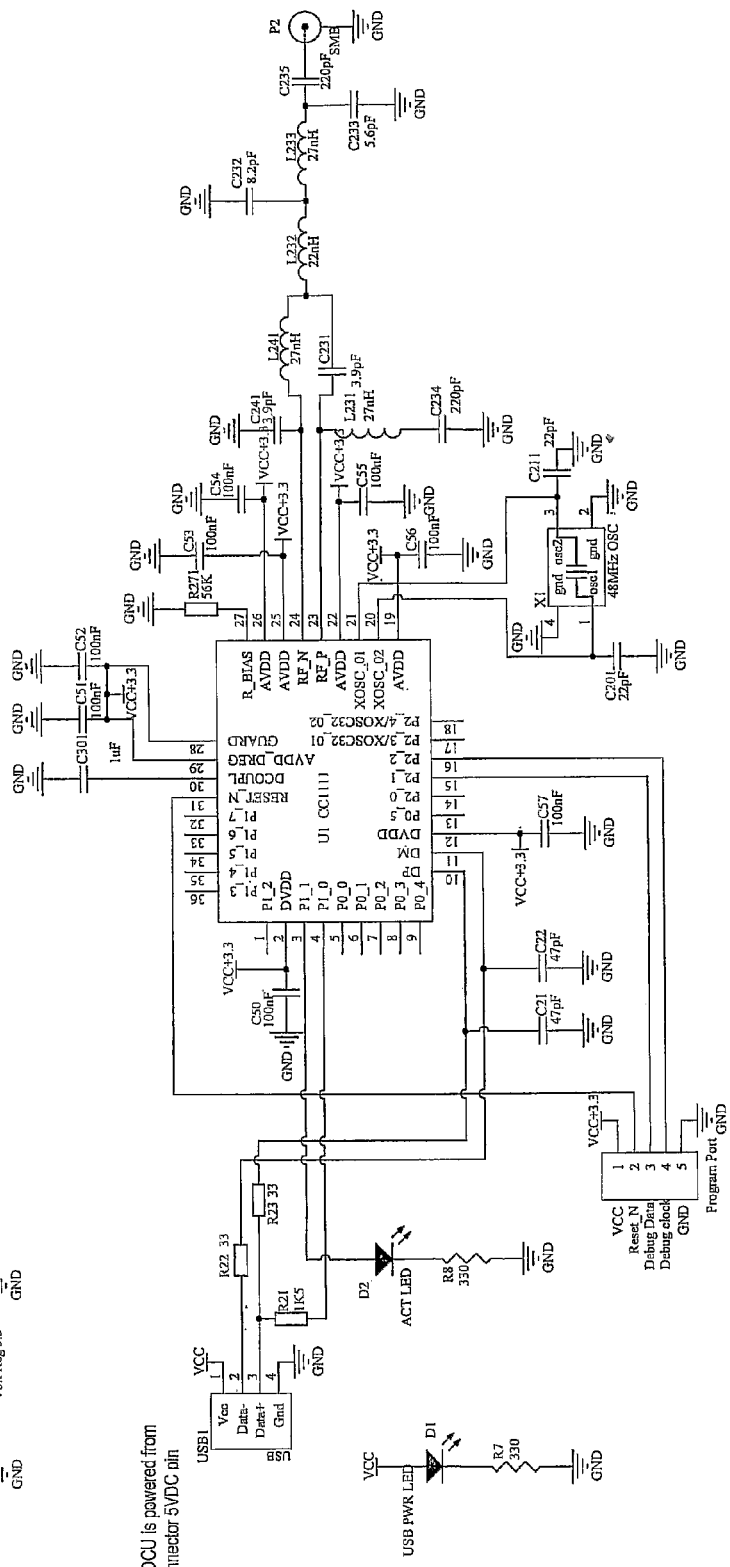
FIG. 4C depicts a circuit diagram for an alternative Field Data Collection Unit.
Figure 4D:
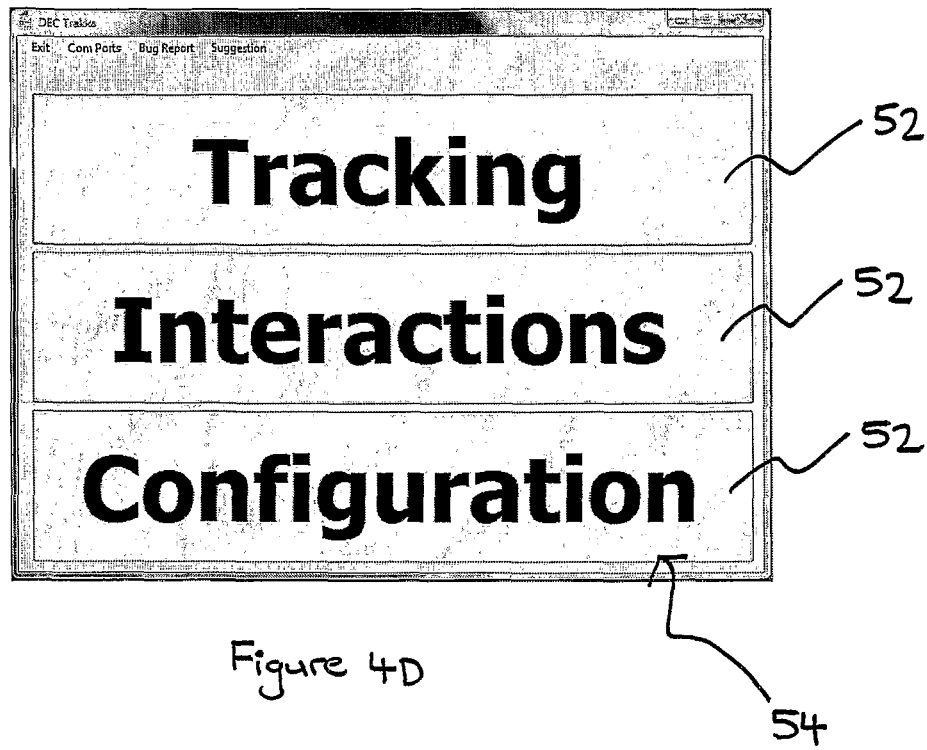
FIG. 4D depicts a MAIN page displayed on a display of the Field Data Collection Unit.
Figure 4E:
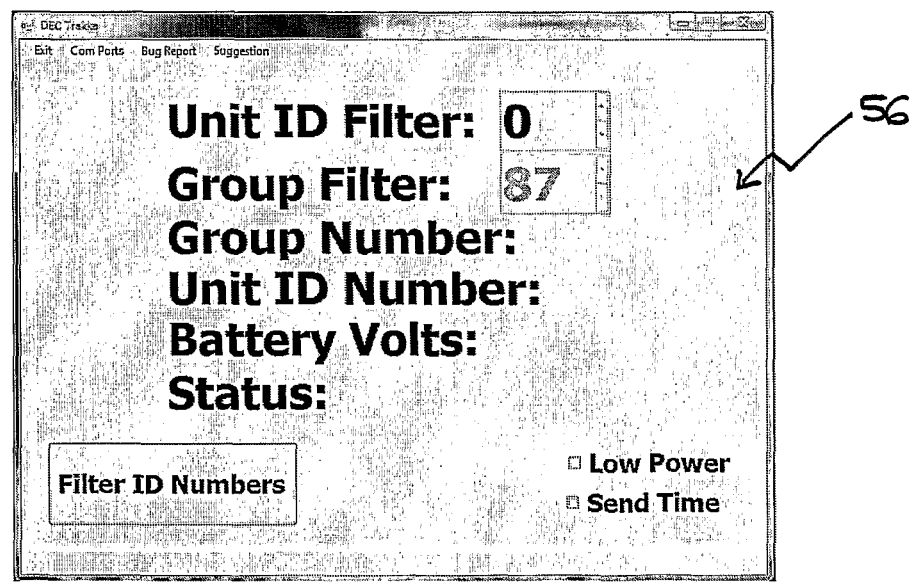
FIG. 4E depicts a TRACKING page displayed on a display of the Field Data Collection Unit.
Figure 4F:
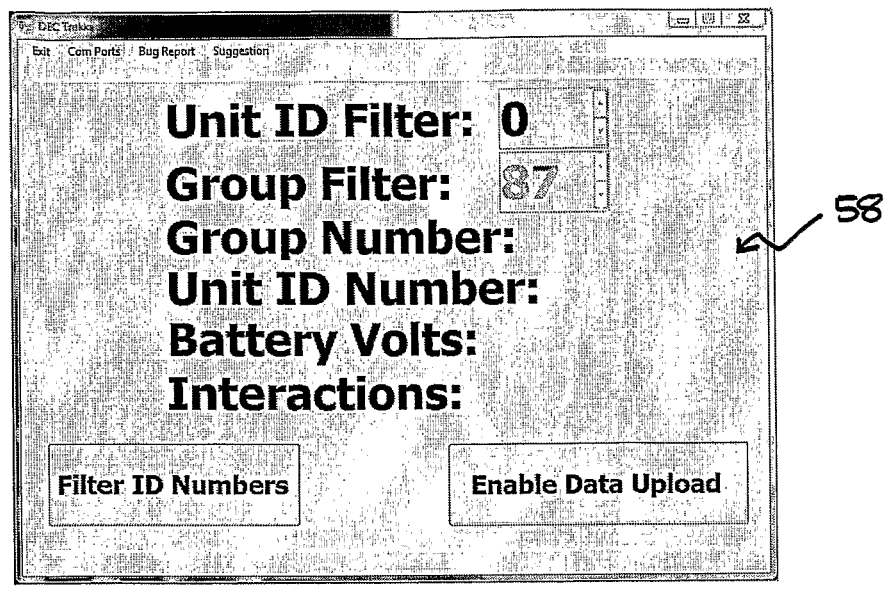
FIG. 4F depicts an INTERACTION page displayed on a display of the Field Data Collection Unit.
Figure 4G:
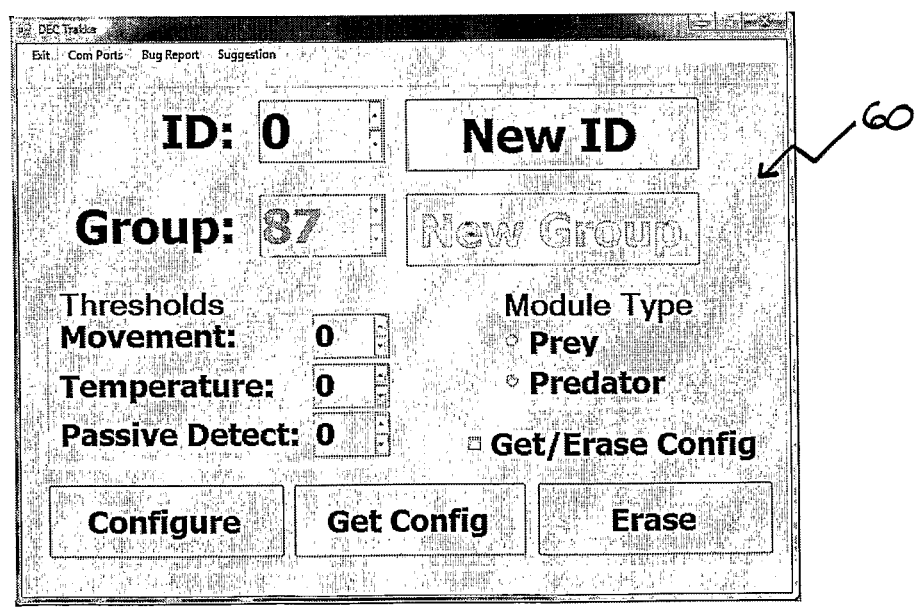
FIG. 4G depicts a CONFIGURATION page displayed on a display of the Field Data Collection Unit.

In a further embodiment of the invention, the transceiver interface unit 6 is coupled to the computer 5 via a Universal Serial Bus ("USB") connection. FIG. 4C of the drawings depicts a circuit diagram for such connection.

An advantage of such a USB connection is that it is hot pluggable and allows for a faster serial data stream between devices. Additionally, new computing devices often use USB rather than RS232 serial connection.

In order to meet the RF transmission/reception for data acquisition criteria, the use of a ¼ wavelength wire whip antenna which is detuned to achieve design criteria of range and physical installation is used.

In the first embodiment of the invention, both the predator unit 3 and the prey unit 2 are constructed using surface mount components fitted onto 0.6 mm double sided print circuit board ("PCB") (not shown) to a configured shape miniaturized to fit onto a suitable collar device that could be worn by the intended animal. In alternative embodiments of the invention, other constructions can be used. For example, surface mount components can be fitted onto 0.5 mm double sided PCB's sandwiched together with a thin insulating material between.

The PCB's are constructed using 0.6 mm thick two layer PCB with maximum ground plane coverage and the minimum possible clearances between tracks and ground plane to optimize RF performance.

The nRF401 DC voltage supplies are all decoupled as close as possible to the power pins with high performance RF capacitors. The power supplies are filtered with large surface mount capacitor (4.7 μF tantalum) in parallel with the smaller value capacitor. All nRF401 supply voltages are filtered and routed separately from the supply voltages to other digital circuitry (star routed).

Long power supply lines on the PCB are minimized. The topside RF ground plane is connected directly to the bottom ground plane, by holes in or close to the Vss pads. In this embodiment, holes are drilled in the PCB with a wire link being passed through the hole and then soldered to both the top and the bottom ground plane. Any excess wire is then removed. This is unlike commercially-available PCB's which use plated vias to connect PCB layers, and is a technique which can be used in the alternative embodiments of the invention.

Full swing digital data or control signal lines are routed away from the phase locked loop filter components and external voltage control oscillator (VCO) inductor.

As mentioned above, in order to achieve the required operational lifetime of 1 year, a number of power saving strategies are employed in hardware and firmware implementations.

As already described, the hardware for the prey unit 2 has a passive RF detect circuit 19 designed to convert received RF energy to electrical energy. The passive RF detector circuit 19 uses a voltage multiplier (or doubler) RF diode/capacitor network to multiple the voltage that is developed at the RF detect circuit antenna. This passive RF detector circuit 19 is connected to an analogue-to-digital input on the prey unit microcontroller 17 which can be monitored in low power mode. When a specified DC voltage is sensed at this input, the prey unit microcontroller 17 will 'wake up' and activate the prey unit transceiver 18 and start transmitting the prey unit unique identifier ID and mortality status (as sensed through the temperature sensor 15) data of the prey unit 2 for the predator unit 3 to receive and log.

Power conservation strategies are also implemented in firmware to place devices into low power consumption modes; units will activate when specific activity is sensed.

The operation of the tracking system 1 will now be described. The operation is implemented in firmware within the prey unit 2, the predator unit 3 and the FCDU 4.

The predator unit 3 carries out the following functions:
it logs interactions with prey, namely:
  logs unique prey unit 2 unique identifiers and mortality status (determined via the temperature sensor 15);
  records a timestamp of a logged event to a resolution of 1 minute; and
  logs 3650 interactions per year—assuming a maximum of 10 interactions per day.
it continues prey unit 2 excitation after the initial contact to provide an indication of length of interaction.
periodically checks for the presence of the FCDU 4 and uploads data to the FCDU 4 when one is found.

The prey unit 2 carries out the following functions:
it stores the mortality status of the prey that it is mounted thereon, which may be either 'LIVE' or 'DEAD', determining such status through the use of the temperature sensors 15; and
where the body temperature is sensed that the prey body temperature has dropped below a threshold temperature the prey unit 2 re-writes the status as 'DEAD'. This threshold is hard-coded into the prey unit microcontroller 17 as discussed above.
When the prey has had an interaction encounter, i.e. transmitted it's data and after that is determined as dead or the prey has become deceased by natural causes the module associated with the prey animal is operable to enter or go into a beacon mode transmitting a periodic pulse so that the user/researcher can locate the collar containing the module (prey unit 2) attached to the deceased prey animal.

The FDCU 4 is operable to retrieve data from predator unit 3. It is operable to receive transmissions from nearby predator units 3 and logs any data sent by a nearby predator unit 3 in response to a request. The operation will be described in more detail below. Specifically it has the following properties:
it has a retrieval range from a predator unit 3 to the FCDU 4 of approximately 50 m. The practical range will vary depending upon a number of factors. Factors such as environmental conditions and location of the predator unit 3 (e.g. it may be underground) mean that this range may be less than 50 m.
the FDCU 4 is fitted with a directional antenna to enable communication with and positioning of a single predator unit 3. In situations where more than one predator unit 3 is located in a small area, collision detection methods can be used to mitigate these effects. Specifically, firmware on the predator unit microcontroller 12 is operable to sample the transmission medium and make sure that no other radio is transmitting before making a transmission. In an alternative embodiment, a predator unit 3 and/or a prey unit 2 will be operable to wait a random amount of time before responding to a request.
received data is stored in comma delimited text files, with the following format:
  Interaction Minute, Interaction Hour, Interaction Day (1 to 65536), Prey ID number, Prey Mortality Status, Predator ID number To determine the Interaction Day, the FDCU 4 (and specifically the software running on the computer 5) will have data stored thereon detailing the date at which any predator unit 3 was configured. From that, and given the date of any interaction, data about which is received from the predator unit 3, the FCDU 4 will be able to determine the day number i.e. Interaction Day of the interaction.

Figure 5:
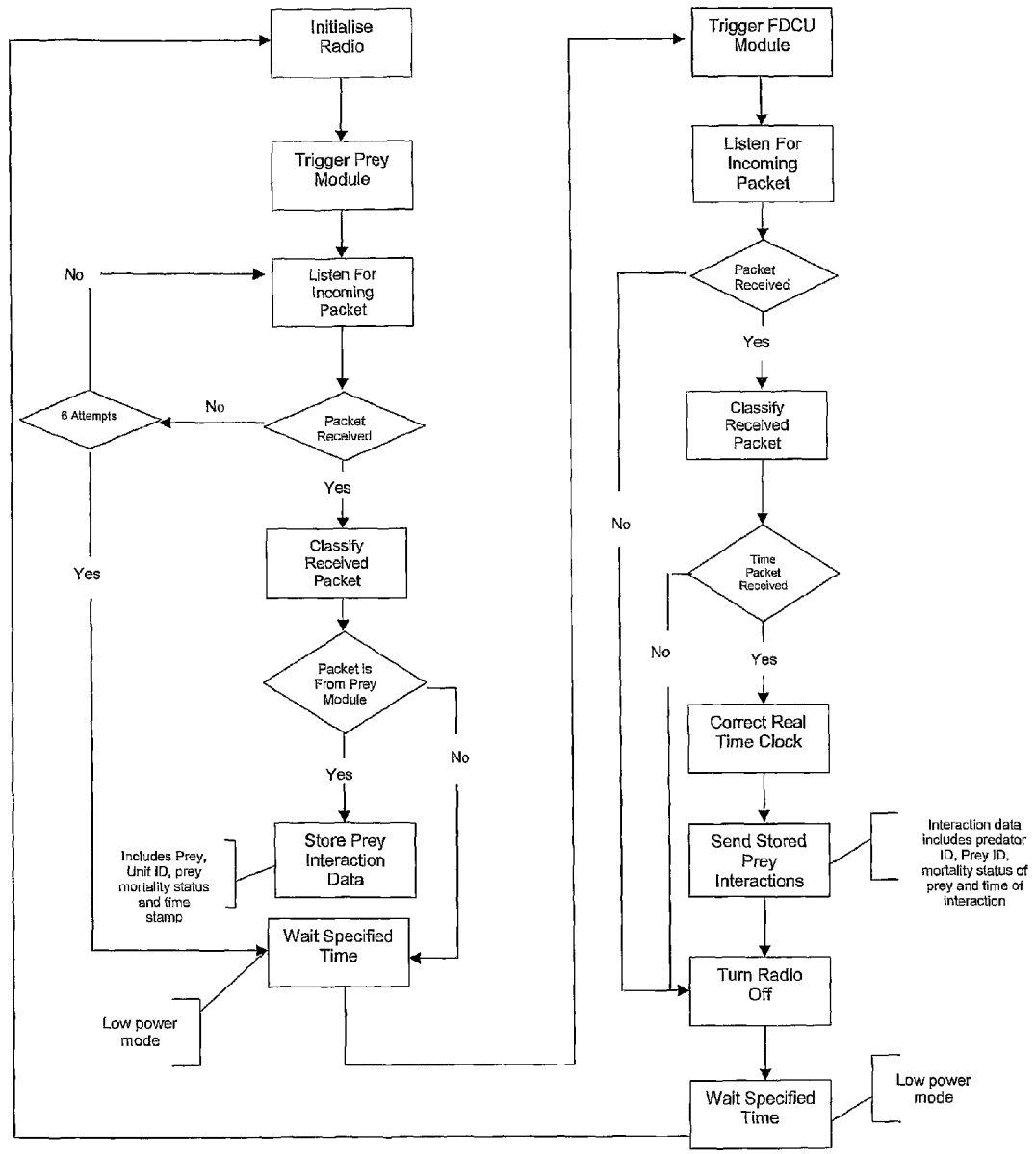
FIG. 5 depicts a firmware flowchart illustrating operation of the predator unit of FIGS. 1 and 2.

The operation of the predator unit 3 is illustrated in FIG. 5 and will now be described with reference thereto.

The operation is under control of the predator unit microcontroller 12. At the beginning of operation of the predator unit 3, the predator unit transceiver 7 is initialised and a trigger signal is sent to any nearby prey units 2. The predator unit 3 listens for any incoming packets of data from nearby prey units 2. If no incoming data packets are received, then the predator unit 3 will make up to six attempts to listen. If no incoming data packets are received after six attempts, then the predator unit 3 waits a predetermined time before proceeding with triggering a nearby FCDU 4 for data transmission therebetween. The use of a wait time at this point also provides for a low power mode to be enabled, thus saving predator unit battery power.

When the predator unit 3 detects an incoming data packet, it classifies the data packet and determines if it is from a prey unit 2. If the data packet is from a prey unit 2, then it extracts the prey unit data: namely the prey unit unique identifier, the mortality status, and stores the prey unit data in the memory 10. In addition, the predator unit 3 extracts a time stamp from the real-time clock integrated in the predator unit 3. The real time clock is a 16 bit counter and oscillator amplifier (internal to the predator unit microcontroller 12) coupled to a 32768 Hz watch crystal and capacitor network external to the predator unit microcontroller 12.

After either storing the prey unit data (or in the absence of any incoming data packets) the predator unit waits the predetermined period of time and then proceeds to trigger a nearby FCDU 4 by sending a trigger data packet containing the predator unit unique identifier. The predator unit 3 then listens for any incoming time data packets from an FCDU 4 indicating that it should upload any stored data to the FCDU 4. The predator unit 3 also uses the incoming time packet to make sure that its real time clock is synchronised with the FDCU 4 and in particular the computer 5.

If no incoming time data packets are received, then the predator unit microcontroller 12 is operable to turn off the predator unit transceiver 7. If an incoming time data packet is received, then it classifies the received incoming data packet, and determines the time of receipt of the packet in order to determine the Interaction Day as described above. The predator unit microcontroller 12 is also operable to correct the real time clock of the predator unit 3 as mentioned above and to then transmit the stored the prey unit data to the FCDU 4. The predator unit microcontroller 12 is then operable to turn off the predator unit transceiver 7.

The predator unit 3 is then operable to wait a further predetermined period of time before initialising the predator unit transceiver 7 once more and to run through the cycle described above. This wait time is also another low power mode to save battery power.

Figure 6:
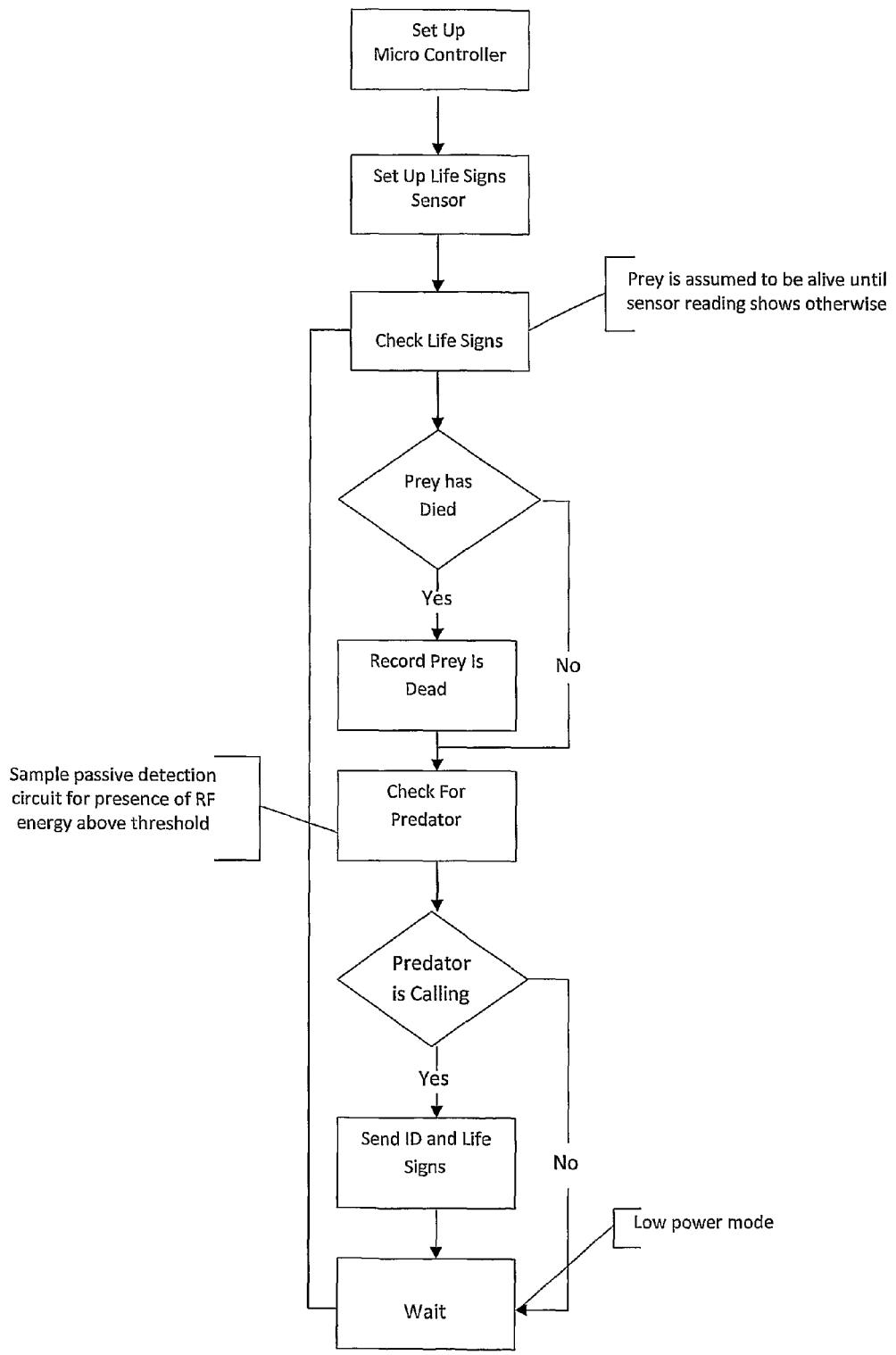
FIG. 6 depicts a firmware flowchart illustrating operation of the prey unit of FIGS. 1 and 3.

The operation of the prey unit 2 is described with reference to FIG. 6.

The first step comprises a set up process of the prey unit microcontroller 17. This set up process involves a variety of functions that enable the prey unit microcontroller 17 to carry out its required functions. For example, almost all of the electrical connections (chip pins) are multiplexed (two or more of the various functions exhibited by one pin) in some way. At power up these functions must be either turned on or turned off and configured in such a way that the microcontroller 17 acts in the desired manner and that the various functionality required does not cause electrical signal contention on any pin of the prey microcontroller 17. As an example, the pin that samples the passive RF detection circuit 19 on the prey unit 2 may be configured as either a digital 10 or as an analogue input to the integrated analogue-to-digital converter. Registers internal to the prey unit microcontroller 17 must be loaded with values that cause this pin to be an analogue input and not a digital output or input. Incorrect configuration of this pin will render the passive detection feature useless, will cause excessive power consumption, and may damage sensitive circuitry.

The temperature sensor 15 is then configured. The temperature sensor 15 has several operating modes which may be activated by setting registers internal to it to predetermined values that control the behaviour of the temperature sensor 15. It has been determined that the operating mode for this temperature sensor 15 mode that uses least power is a single measurement mode where each temperature conversion is requested by the prey unit microcontroller 17. This is in contrast to the free running mode where the temperature sensor 15 continuously converts analogue temperature data to serial data and the thermostat mode where the temperature sensor 15 makes continuous conversions and compares them to upper and lower limit values and sets or resets an alarm pin according to the result. The upper and lower limit values are also configurable The prey unit microcontroller 17 is operable to check that the prey is alive by monitoring the temperature sensor 15 and the detected temperature. The prey is assumed to be alive unless the temperature sensor reading 15 indicates otherwise. If it is detected that the prey has died, then the prey unit microcontroller 17 is operable to record data to this effect. This data is stored in the prey unit memory 10.

The prey unit microcontroller 17 is then operable to check for the proximity of a predator unit 3. This is achieved through operation of the passive RF detector circuit 19 described above. If a predator unit 3 is nearby, and the prey unit microcontroller 17 is operable to transmit its prey unit unique identifier data and the mortality status/life sign status i.e. 'DEAD' or 'LIVE' to the predator unit 3 via the prey unit transceiver 18 which has been put in an active status due to detection of a nearby predator unit 3.

Once the data has been transferred, then the prey unit microcontroller 17 is operable to place the prey unit 3 in the low power mode for a predetermined period of time, until the cycle described above is repeated.

Figure 7:
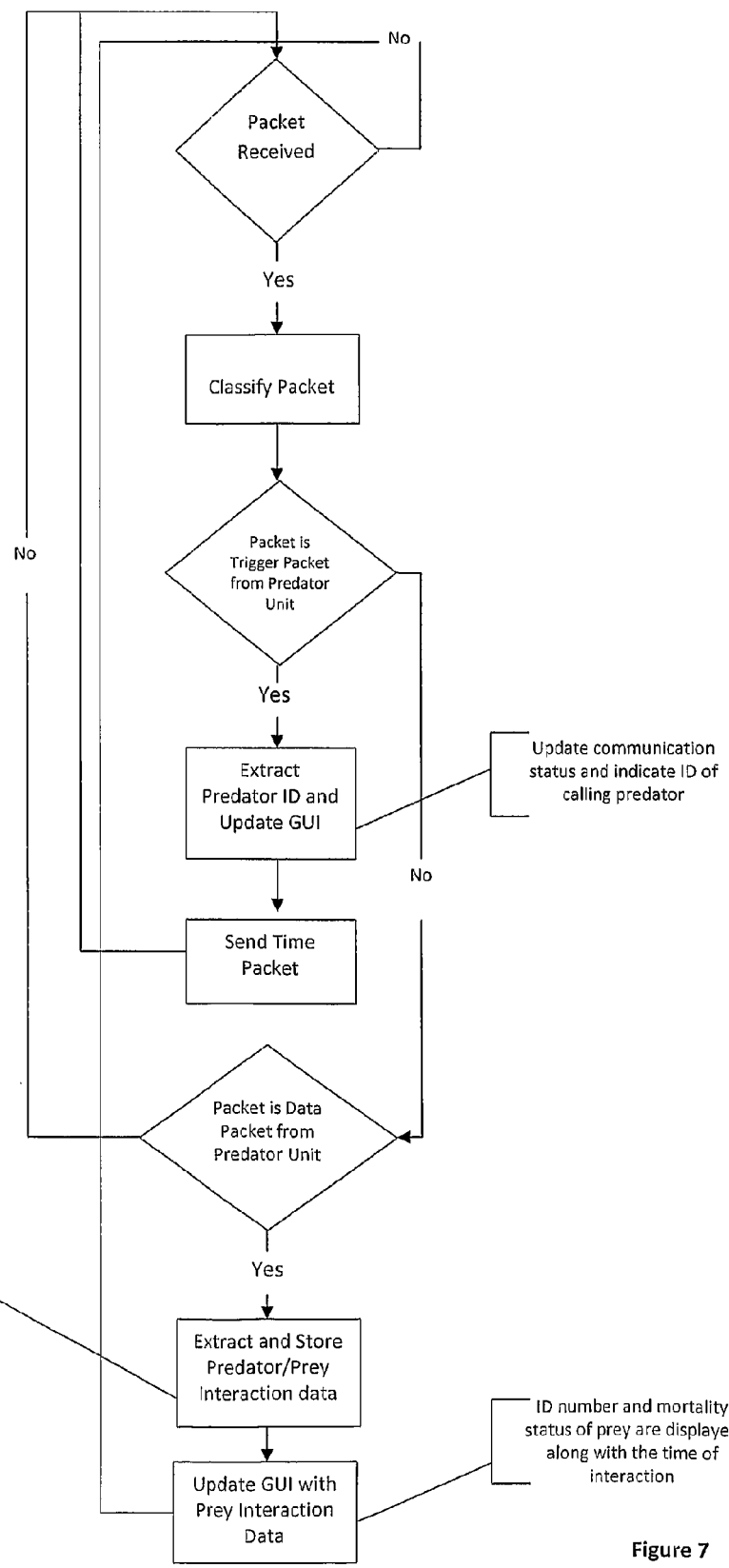
FIG. 7 depicts a firmware flowchart illustrating operation of the Field Data Collection Unit of FIGS. 1, 4A and 4B.

The operation of the FCDU 4 is now described with reference to FIG. 7.

As discussed above, the predator unit 3 is operable to send prey unit data to the FCDU 4 after triggering the FCDU 4. The FCDU 4 is operable to listen continuously for transmissions from a predator unit 3. The only time the FCDU 4 does not listen for such communications is when it is responding to a trigger from the predator unit 3. If a data packet is received by the FCDU 4, then the FCDU 4 is operable to classify the data packet received. If it determines that the data packet is a trigger packet from a nearby predator unit 3—as described in relation to FIG. 5 above—then the FCDU 4 is operable to extract the predator unit unique identifier and to send it to the computer 5 for storage and display on the computer display (for example) in any appropriate manner. The ID of the triggering predator unit 3 is displayed on the computer 5. A user may also configure the FCDU 4 to respond to a predator unit 3 or to listen only.

The FCDU 4 is then also operable to send a time data packet back to the predator unit 3. This not only serves to update the real time clock of the predator unit 3, but also indicates to the predator unit 3 the presence of a nearby FCDU 4.

As described above, the predator unit 3 waits for receipt of this time data packet before sending the stored prey unit data to the FCDU 4. Upon receipt of the stored prey unit data, the FCDU is operable to extract and store the prey unit data and to then transmit the data to the computer 5 for display and manipulation by the user, as records in a database, for example. It should be noted that the transceiver interface unit 6 is essentially a protocol converter that converts data from an RF format to a normal RS232 for transmission to the laptop where the data is stored as comma delimited data on the laptop 5.

As mentioned above, this data can include the unique identifier for the predator unit 3 and the prey unit 2 as well as other associated information such as time of the interaction, the mortality status of the prey and the time at which that event occurred. As data is stored in comma delimited text files, this data can be used by many applications such as Microsoft® Excel®.

In a second embodiment of the invention, both the predator unit 3 and the prey unit 2 are identically constructed, and hereinafter may each be designated as an entity unit or module 32. Block and circuit diagrams for an entity unit 32 are depicted in FIGS. 8 and 9 of the drawings, respectively.

Figure 8:
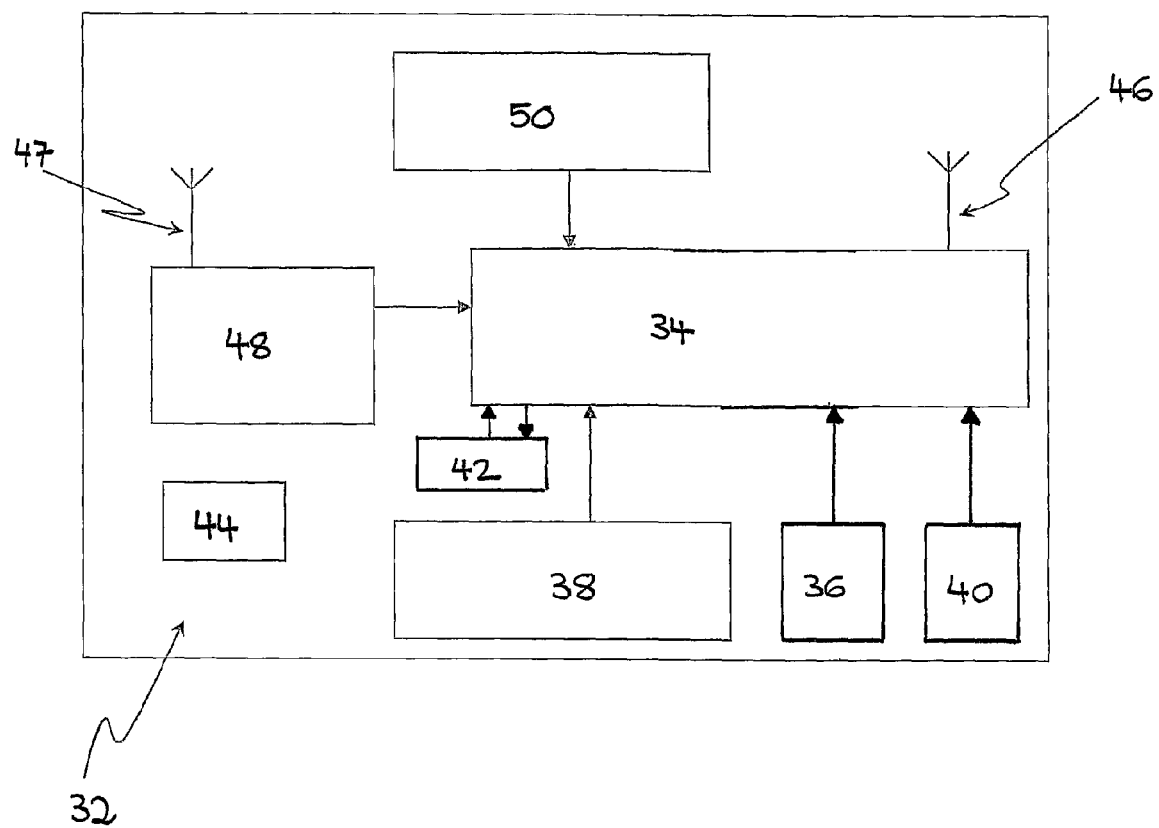
FIG. 8 depicts a block diagram of an entity unit of a second embodiment of a tracking system in accordance with an aspect of the present invention.
Figure 9:
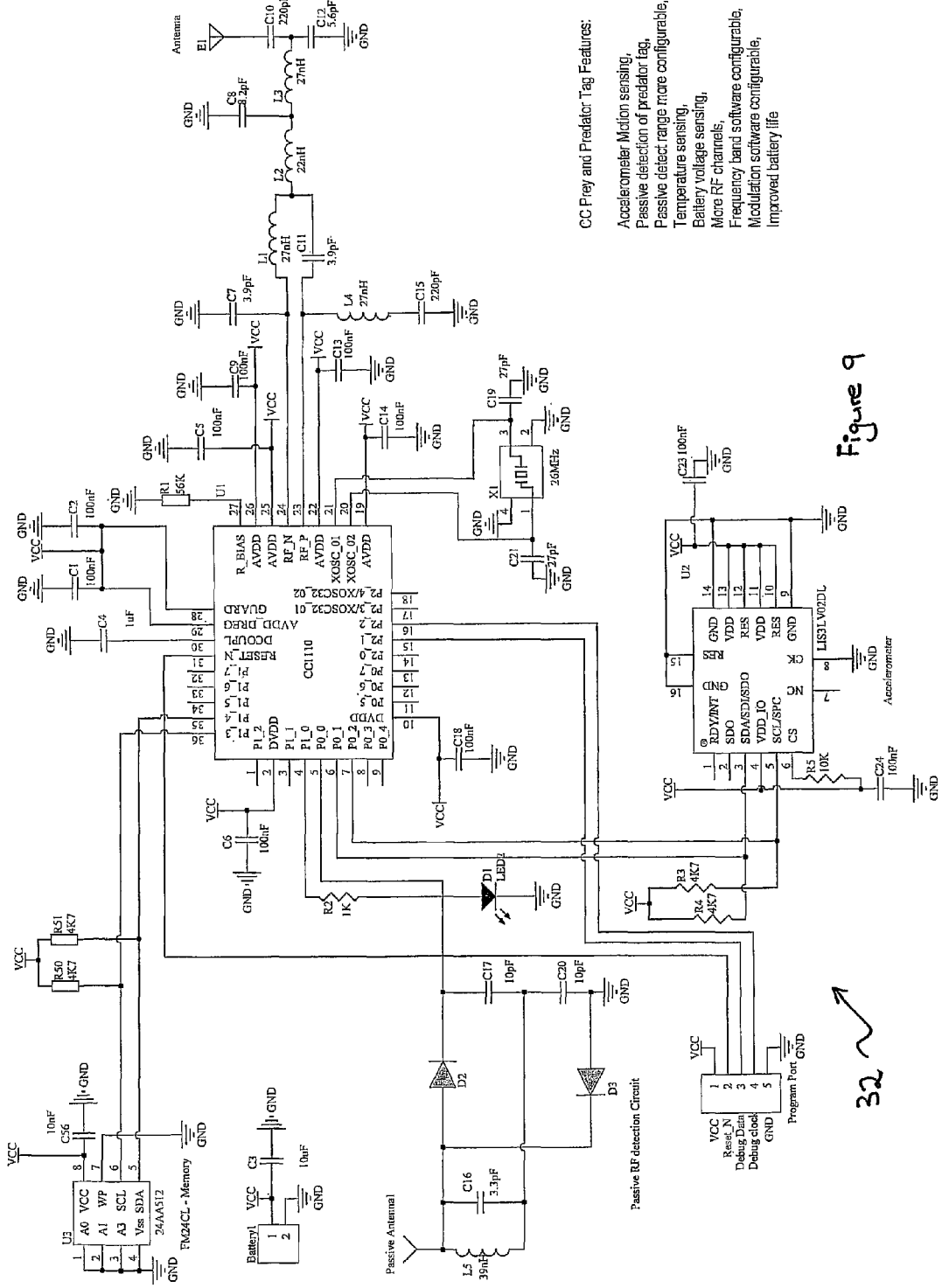
FIG. 9 depicts a circuit diagram for components of the entity unit of FIG. 8.

As can be seen from FIGS. 8 and 9, each entity unit 32 comprises: a communications/control device in the form of a combined microcontroller and transceiver 34; a set of sensors comprising a motion detector 36, a temperature sensor 38, and a power sensor 40; a storage medium in the form of a entity unit memory 42; an entity unit power supply 44; a first entity unit antenna 46 coupled to the combined microcontroller and transceiver 34; a second entity unit antenna 47 coupled to a passive RF detector circuit 48; and an entity unit programming port 50.

The combined microcontroller and transceiver 34 comprises the CC1110 system on chip device provided by Texas Instruments. Having on chip RF and microcontroller is advantageous as it provides a smaller PCB foot print, allowing the circuit to be made smaller, for lower power consumption and better integration of RF and digital compontents.

The motion detector 36 comprises an accelerometer device in the form of a micro electro-mechanical system operable to measure proper acceleration—the acceleration experienced relative to freefall. The accelerometer is a multi-axis model operable to detect information such as magnitude and direction of the acceleration as a vector quantity, and to provide the detected information to the input of the combined microcontroller and transceiver 34 to sense position, vibration and shock and by analysis of the same to determine the activity state of the animal on to which the entity unit 32 is mounted, for example sleeping, hunting, sprinting, or mating.

The temperature sensor 38 is identical to the temperature sensor 15 of the prey unit 2 of the first embodiment of the invention.

The power sensor 40 comprises a battery voltage sensor operable to monitor a voltage of a battery of the entity unit power supply 44 and generate a signal if it falls below a predetermined threshold.

The invention is not limited to the sensors described, and in alternative embodiments of the invention may be provided with any other sensors or detectors that may be required to collect or sense data of interest, including, for example, positional information, image/sound data, and/or physiological data.

The entity unit memory 42 comprises an FM24CL F-RAM memory. Data obtained via sensors in the set of sensors is stored in the entity unit memory 42, along with any data received via communication with another entity unit 32, for subsequent communication to another entity unit 32 and/or the FDCU 4.

The entity unit programming port 50 enables the entity unit 32 to be programmed in the same way as with the predator unit 3 and prey unit 2 as hereinbefore described. In particular, the entity unit programming port 50 is used to enable a user to program the entity unit combined microcontroller and transceiver 34 firmware and is removed from the printed circuit board—upon which the combined microcontroller and transceiver 34 is mounted—and which is then encapsulated in water proofing material, during the construction process. The entity unit 32 data configured includes an entity unit unique identifier, as well as additional data such as accelerometer, temperature sensor, and battery voltage sensor parameters, and passive RF detector circuit 48 parameters.

Figure 10:
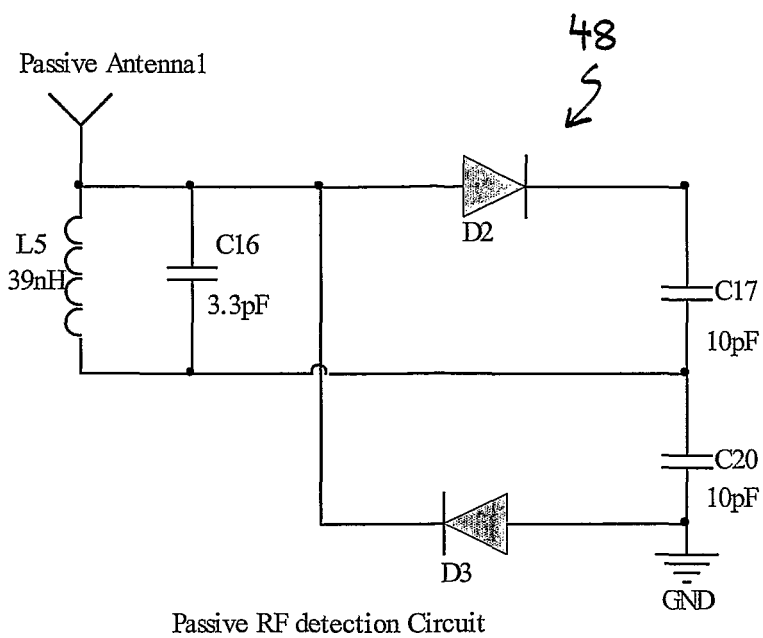
FIG. 10 depicts a passive detection circuit of the entity unit of FIG. 8.

The enitity unit 32 is activated from a default low-power mode by the proximity of another entity unit 32, or the FDCU 4, within a distance using the passive RF detector circuit 48. The passive RF detector circuit 48 of the second embodiment of the invention is illustrated in FIG. 10 of the drawings.

The passive RF detector circuit 48 develops a voltage in the presence of an external RF signal in close proximity. This voltage is multiplied by the diode and capacitor arrangement in the passive RF detector circuit 48, which is measured by the analogue to digital input on the combined microcontroller and transceiver 34. Once a predetermined voltage is reached, then the combined microcontroller and transceiver 34 is operable to transmit the entity unit unique identifier and other data stored in the entity unit memory 42 to the other entity unit 32, or the FDCU 4. In this way, the entity unit 32 is only active and transmitting when another entity unit 32 or the FDCU 4 is in close proximity to it. As in the case of the first embodiment of the invention, this provides for power conservation—an important consideration when these modules are operating in the field.

Figure 11:
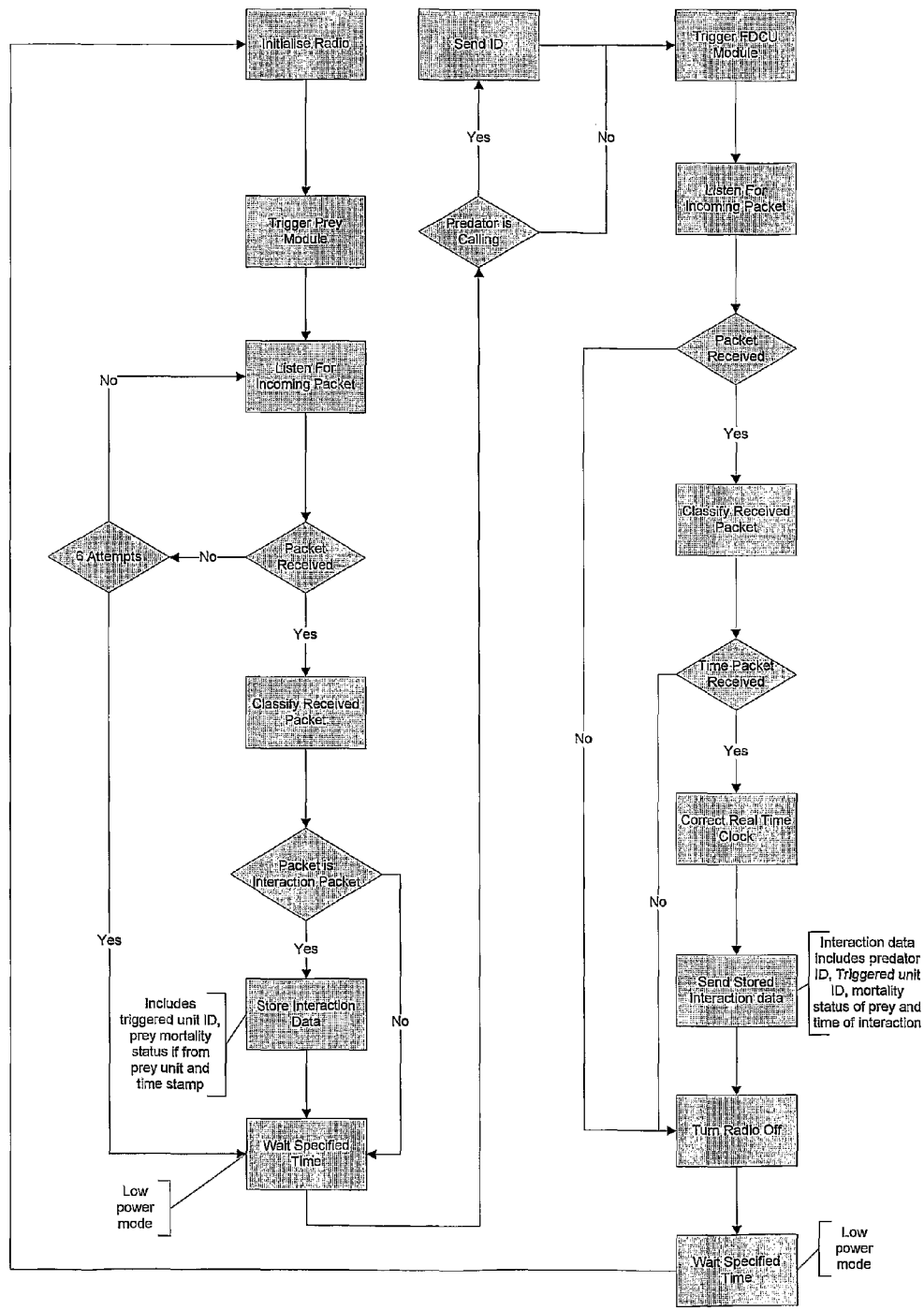
FIG. 11 depicts a firmware flowchart illustrating operation of the entity unit of FIG. 8 associated with a predator animal.
Figure 12:
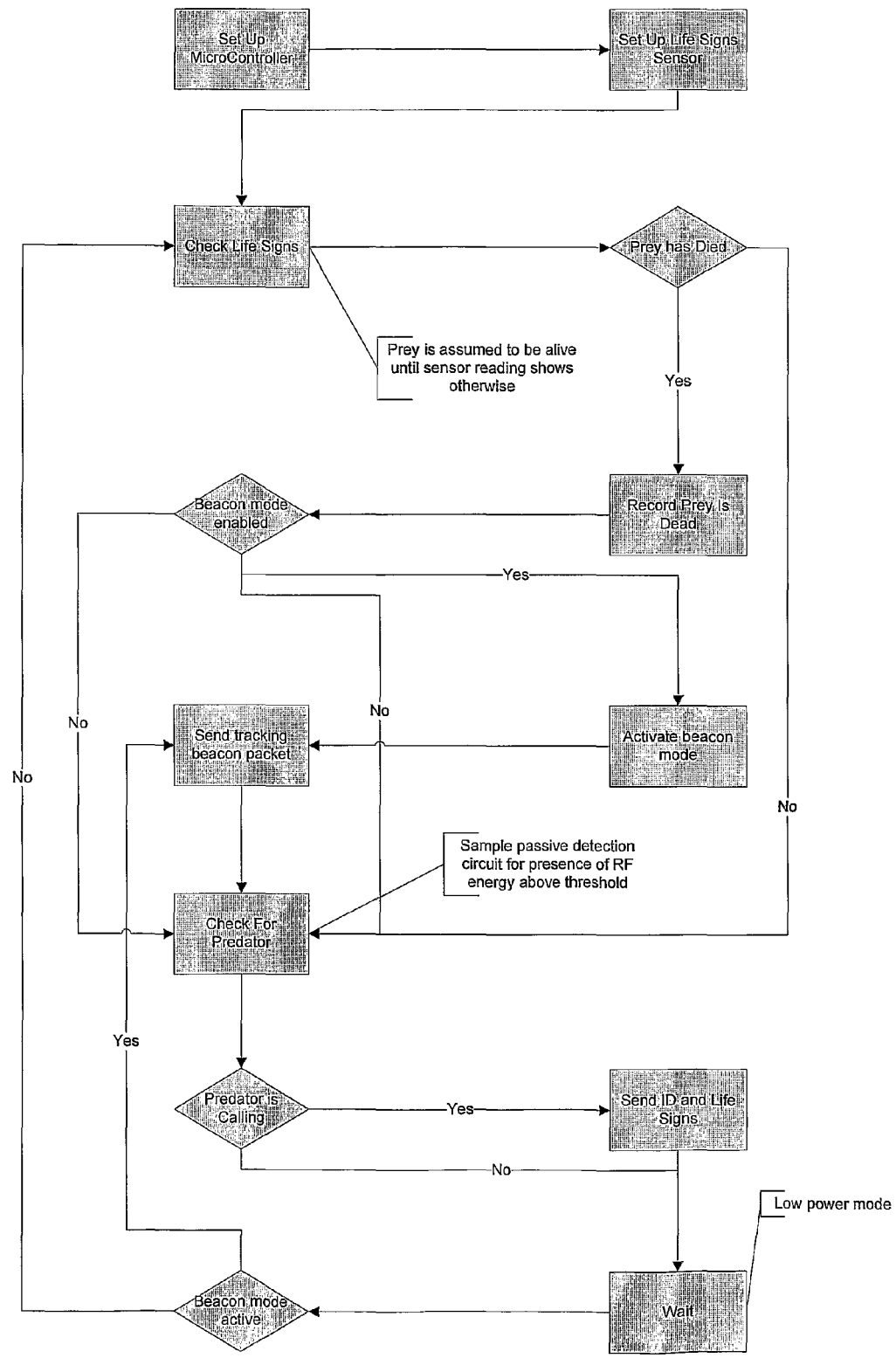
FIG. 12 depicts a firmware flowchart illustrating operation of the entity unit of FIGS. 8 associated with a prey animal.

The entity unit 32 is operable to perform the functions of both the prey unit 2 and the predator unit 3 as hereinbefore described in relation to the first embodiment, with the exception that additional data or information gathered via the set of sensors is stored in the entity unit memory 42 and communicated from one entity unit 32 to another entity unit 32 and/or to the FCDU 4. In this regard, FIG. 11 depicts a firmware flowchart illustrating operation of the entity unit 32 when configured to be associated with a predator animal, and FIG. 12 depicts a firmware flowchart illustrating operation of the entity unit 32 when configured to be associated with a prey animal.

The additional information gathered, once communicated to the FCDU 4 facilitates enhanced analysis. For example, when placed on a number of predator and prey animals and configured appropriately, the entity units 32 enable predator to predator interactions and behaviours to be tracked and relevant data recorded, rather than solely predator to prey interactions as in the case of the first embodiment of the invention.

In an alternative embodiment of the invention, in which the modules are provided with sufficient power to meet the consumption/demand requirements, prey to prey interactions and behaviours can also be tracked and relevant data recorded.

Although the invention has been described in relation to an animal tracking application within a native environment, the invention has a number of other applications. Examples include:

1. Identification of herd animals such as cattle. Current RFID technology is particularly unsuited to identification of cattle for the following reasons:
   a. Present equipment is expensive requiring significant expenditure by the grazier.
   b. Currently, RFID tags are incorporated into the ear tags already worn by individual animals. In order to read these RFID tags a tag reader must be waved over the ear tag at close range, an action that may be interpreted as a threat by the herd animal resulting at best in the unsettling of the animal or, at worst, in the operator being either kicked or crushed by the animal.
2. Location of herd animals by monitoring their presence at specific areas such as gate and watering/feeding areas through installation of interrogator units at those areas.
3. Monitoring the effectiveness of stud animal's breeding efforts by recording the number of attempts at servicing females and the state of the female's oestrus cycle at the time of contact—using the same temperature sensor 15 on the prey unit 2, and/or a motion detector 36 such as the accelerometer device of the entity unit 32 of the second embodiment of the invention.
4. Tracking of personnel and equipment in areas where GPS is ineffective such as inside buildings, in heavily wooded areas and in underground mining operations.

It will be understood, therefore that the system of the present invention could be used to track and monitor between any objects. Small changes to the firmware and/hardware may be required, within the scope of the present invention.

It will be evident that other variations of the invention are possible within the scope of the present invention. For example, other suitable circuitry and components can be used. The data collection unit can take other forms rather than a computer and interface. For example, it could take the form of a portable memory suitable for connection to a computer, with the requisite additional components and circuitry. Variations are possible, providing that there is a controller, a RF transceiver that is compatible with the prey and predator units, and any persistent memory along with suitable firmware/software.

Modifications and variations such as would be apparent to a skilled addressee are deemed to be within the scope of the present invention.

The claims defining the invention are as follows:

1. An interaction recording system for recording data associated with an interaction between a first entity and a second entity, the system comprising:
   a first unit associated with the first entity, the first unit comprising a first communication device for communicating data, a first controller, a first storage medium storing data associated with the first entity, and a passive detector; and
   a second unit associated with the second entity, the second unit comprising a second communication device for communicating data, a second controller, and a second storage medium for storing data;
   the passive detector comprising a passive detection circuit and being operable to determine the presence of the second unit within a range of the first unit indicating an interaction between the second entity and the first entity, the first controller being operable, following determination by the passive detector of the presence of the second unit within the range, to activate the first unit from a default lower power mode to a higher power mode in which the first unit is operable to communicate, via the first communication device, some or all of the data stored on the first storage medium, including the first entity data, to the second unit for receipt via the second communication device, the second controller being operable to determine data associated with the interaction other than the received communicated data and to record the data that is determined to be associated with the interaction and the received communicated data, including the first entity data, on the second storage medium, the second unit operates in a first mode comprising a default lower power mode and includes a sensor operable to change state when subject to a condition, the second unit be operable to change to a second mode comprising a higher power mode in response to a detected change in state of the sensor, providing an indication that the condition has been sensed by the sensor;

a data collection unit, wherein the first unit is operable to communicate data stored on the first storage medium, including the first entity data, to the data collection unit, and the second unit is operable to communicate data stored on the second storage medium, including the recorded data that is determined to be associated with the interaction and the first entity data, to the data collection unit; and wherein the passive detector of the first unit is operable to determine the presence of the data collection unit within a range of the first unit, the first controller being operable, following determination by the passive detector of the presence of the data collection unit within the range, to activate the first unit from the default lower power mode to the higher power mode in which the first unit is operable to communicate, via the first communication device, some or all of the data stored on the first storage medium, including the first entity data, to the data collection unit, and the second unit comprises a second detector, the second detector being operable to determine the presence of the data collection unit within a range of the second unit, the second controller being operable, following determination by the second detector of the presence of the data collection unit within the range, to activate the second unit to communicate, via the second communication device, some or all of the data stored on the second storage medium, including the recorded data that is determined to be associated with the interaction and the first entity data to the data collection unit.

2. The system of claim 1, wherein the first unit is operable to communicate the data stored on the first storage medium, including the first entity data, to the second unit in response to a request signal communicated via the second communication device of the second unit and received by the first unit via the first communication device.

3. The system of claim 1, wherein the data associated with the first entity is selected from the group comprising a unique first entity identifier, and a mortality status of the first entity, and the data associated with the interaction is selected from the group comprising an interaction time/date (time stamp), an interaction number, an indication of length of interaction, and a unique second entity identifier.

4. The system of claim 1, wherein the first unit includes one or more sensors operable to determine data associated with the first entity and/or regarding an environment in which the one or more sensors are located for storage on the first storage medium.

5. The system of claim 4, wherein the one or more sensors is selected from the group comprising a temperature sensor, a power sensor, and a motion sensor.

6. The system of claim 5, wherein the power sensor comprises a battery voltage sensor operable to sense a voltage of a battery providing power to the first unit.

7. The system of claim 5, wherein the motion sensor comprises an accelerometer.

8. The system of claim 1, wherein the sensor comprises a motion detector, the condition comprises subjection of the motion detector to motion, and the indication provided is that the second unit is in, or has been subjected to, motion.

9. The system of claim 1, wherein the second storage medium stores data associated with the second entity.

10. The system of claim 9, wherein the data associated with the second entity includes a unique second entity identifier.

11. The system of claim 1, wherein the first communication device and/or the second communication device comprises a transceiver.

12. The system of claim 11, wherein the transceiver comprises a radio frequency transceiver operating at 433 MHz.

13. The system of claim 1, wherein the first unit is arranged for location proximate the first entity and/or the second unit is arranged for location proximate the second entity.

14. The system of claim 12, wherein the first unit and/or the second unit comprise mobile or portable modules.

15. The system of claim 1, wherein the communication comprises wireless communication.

16. An interaction recording method for recording data associated with an interaction between a first entity and a second entity, the method comprising:

associating a first unit with the first entity;
associating a second unit with the second entity;
storing data associated with the first entity on a first storage medium of the first unit;
passively detecting with a passive detection circuit the presence of the second unit within a range of the first unit indicating an interaction between the second entity and the first entity;
activating the first unit from a default lower power mode to a higher power mode following detection of the presence of the second unit within the range;
communicating some or all of the data stored on the first storage medium, including the first entity data, to the second unit;
determining data associated with the interaction other than the communicated data;
recording the data that is determined to be associated with the interaction and the received communicated data, including the first entity data, on a second storage medium of the second unit;
operating the second unit in a first mode comprising a default lower power mode;
changing a state of a sensor of the second unit when the sensor is subject to a condition;
operating the second unit to change to a second mode comprising a higher power mode in response to a detected change in state of the sensor so as to provide an indication that the condition has been sensed by the sensor;
passively detecting the presence of a data collection unit within a range of the first unit, activating the first unit from the default lower power mode to the higher power mode following detection of the presence of the data collection unit within the range, and communicating some or all of the data stored on the first storage medium, including the first entity data, to the data collection unit; and
determining the presence of the data collection unit within a range of the second unit, and communicating some or all of the data stored on the second storage medium, including the recorded data that is determined to be associated with the interaction and first entity data, to the data collection unit.

17. The method of claim 16, wherein the data associated with the first entity relates to the first entity and/or to an environment of the first entity.

18. The method of claim 16, comprising receiving a request and communicating some or all of the data stored on the first storage medium, including the first entity data, to the second unit in response to the request.

19. The method of claim 16, wherein the range is predetermined.

20. The method of claim 16, wherein the data associated with the first entity includes a temperature of the first entity.

21. The method of claim 16, including determining whether the first entity and/or the second entity is in motion.

22. The method of claim 16, comprising sensing data associated with the first entity and or regarding an environment in which one or more sensors are located and storing the sensed data on the first storage means.

23. The method of claim 16, wherein associating the first unit with the first entity comprises mounting the first unit on the first entity or implanting the first unit at least partially within the first entity, and/or associating the second unit with the second entity comprises mounting the second unit on the second entity or implanting the second unit at least partially within the second entity.

24. The method of claim 16, wherein the second unit comprises a data collection module.

25. A first unit that is adapted to be used as the first unit of the interaction recording system defined by claim 1.

* * * * *